United States Patent
Kupratis et al.

(10) Patent No.: US 12,420,914 B2
(45) Date of Patent: Sep. 23, 2025

(54) AIRCRAFT AIRFRAME COMPONENT WITH AIR SYSTEM

(71) Applicant: RTX Corporation, Farmington, CT (US)

(72) Inventors: Daniel B. Kupratis, Wallingford, CT (US); Paul R. Hanrahan, Sedona, AZ (US); Benjamin T. Mylrea, Jupiter, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/400,416

(22) Filed: Dec. 29, 2023

(65) Prior Publication Data

US 2025/0214698 A1    Jul. 3, 2025

(51) Int. Cl.
| | |
|---|---|
| *B64C 21/06* | (2023.01) |
| *B64C 5/06* | (2006.01) |
| *B64C 21/02* | (2006.01) |
| *B64C 21/08* | (2023.01) |
| *B64C 39/10* | (2006.01) |

(52) U.S. Cl.
CPC ............ *B64C 21/06* (2013.01); *B64C 5/06* (2013.01); *B64C 21/025* (2013.01); *B64C 21/08* (2013.01); *B64C 39/10* (2013.01); *B64C 2039/105* (2013.01)

(58) Field of Classification Search
CPC .......... B64C 5/02; B64C 15/14; B64C 21/01; B64C 21/08; B64C 2230/20; B64C 37/02
See application file for complete search history.

(56) References Cited

U.S. PATENT DOCUMENTS

| | | | | |
|---|---|---|---|---|
| 3,155,346 A | * | 11/1964 | Charlton | B64C 15/14 244/90 R |
| 4,391,424 A | | 7/1983 | Bartoe, Jr. | |
| 4,477,040 A | | 10/1984 | Karanik | |
| RE35,387 E | * | 12/1996 | Strom | F02K 1/002 244/75.1 |

(Continued)

FOREIGN PATENT DOCUMENTS

DE    2430406 A1    1/1975

OTHER PUBLICATIONS

DE-2643391-B3 to Best, Ian. With English translation. (Year: 2009).*

(Continued)

*Primary Examiner* — Joshua J Michener
*Assistant Examiner* — Michael B. Kreiner
(74) *Attorney, Agent, or Firm* — Getz Balich LLC

(57) ABSTRACT

A system for an aircraft includes a vane and an air system. The air system includes a first air circuit and a first door assembly. The first air circuit extends in the vane to a first circuit outlet at a first side of the vane. The first door assembly is arranged at the first circuit outlet. The air system is configured to exhaust a flow of air out of the first air circuit through the first circuit outlet during a first mode and a second mode. The first door assembly is configured to direct the flow of air exhausted from the first circuit outlet longitudinally towards a leading edge of the vane during the first mode. The first door assembly is configured to direct the flow of air exhausted from the first circuit outlet longitudinally towards a trailing edge of the vane during the second mode.

18 Claims, 18 Drawing Sheets

(56) References Cited

U.S. PATENT DOCUMENTS

| | | | |
|---|---|---|---|
| 5,899,416 A * | 5/1999 | Meister | B64C 21/06 |
| | | | 244/87 |
| 7,143,983 B2 * | 12/2006 | McClure | B64C 15/14 |
| | | | 244/90 A |
| 7,395,988 B2 * | 7/2008 | Richardson | B64C 27/18 |
| | | | 244/17.19 |
| 8,128,037 B2 | 3/2012 | Powell | |
| 8,245,976 B2 | 8/2012 | Sakurai | |
| 8,484,894 B2 | 7/2013 | Sakurai | |
| 9,623,959 B2 | 4/2017 | Schrauf | |
| 10,472,052 B2 * | 11/2019 | Heller | B64C 5/02 |
| 10,967,955 B2 | 4/2021 | Heuer | |
| 10,974,817 B2 * | 4/2021 | Heuer | B64C 5/02 |
| 11,214,376 B2 * | 1/2022 | Kutzmann | B64D 15/04 |
| 11,230,330 B2 * | 1/2022 | Parry-Williams | B62D 35/007 |
| 11,472,560 B2 * | 10/2022 | Pachidis | B64D 27/10 |
| 11,492,099 B2 * | 11/2022 | Cummings | B64D 33/04 |
| 11,565,795 B2 | 1/2023 | Heuer | |
| 2015/0083866 A1 | 3/2015 | Biedscheid | |
| 2018/0265208 A1 * | 9/2018 | Yousef | B64C 21/01 |

OTHER PUBLICATIONS

EP Search Report for EP Patent Application No. 24223242.9 dated May 9, 2025.

* cited by examiner

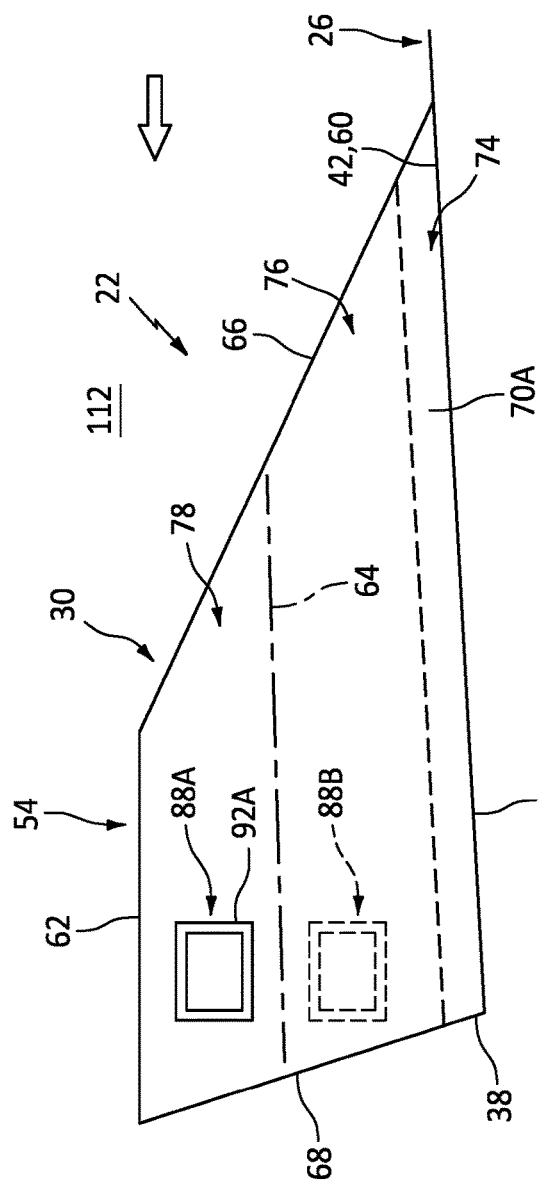
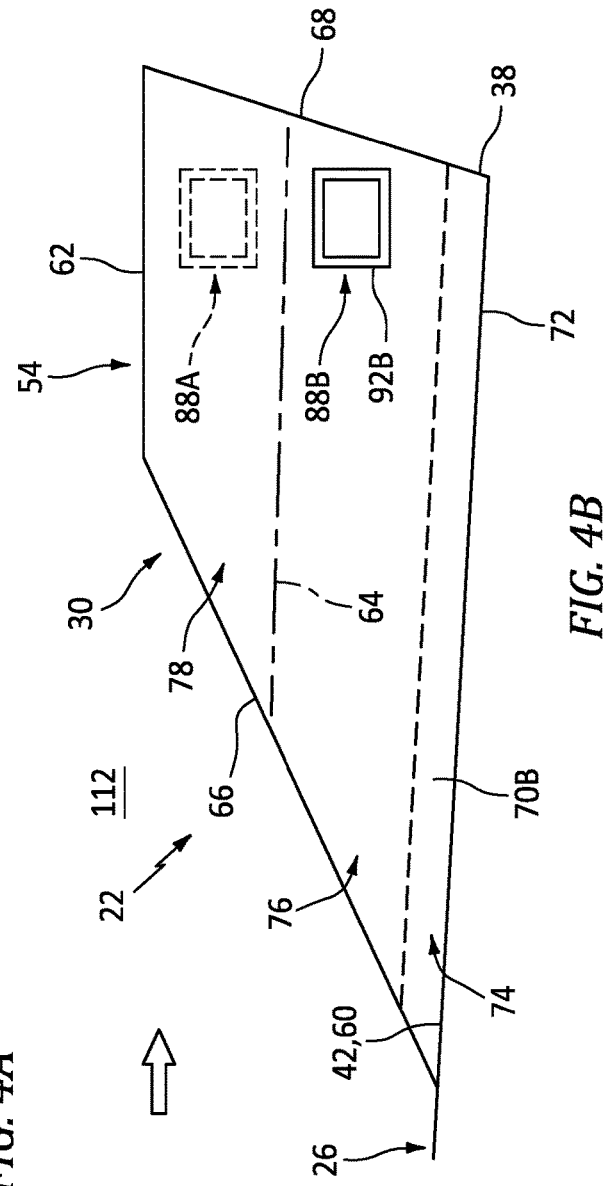

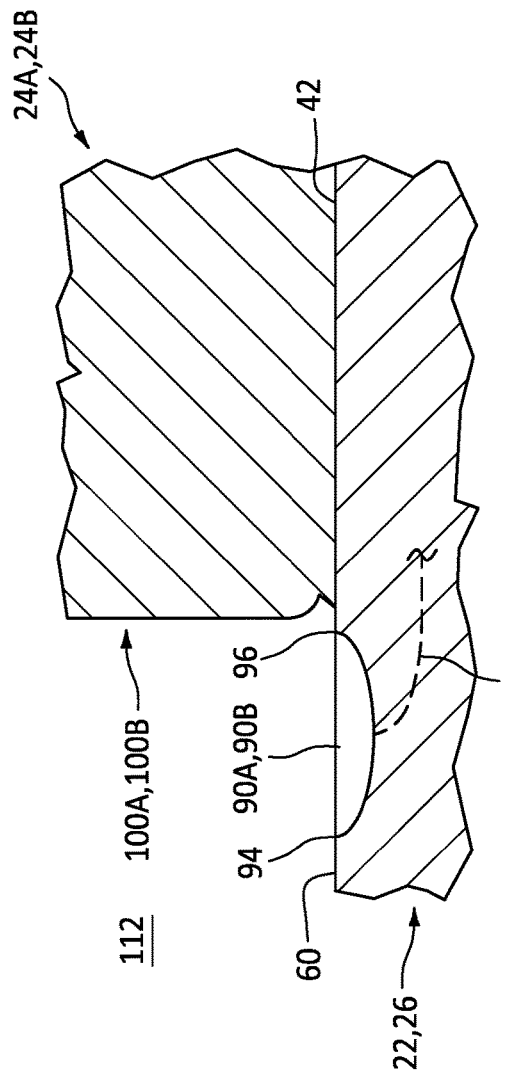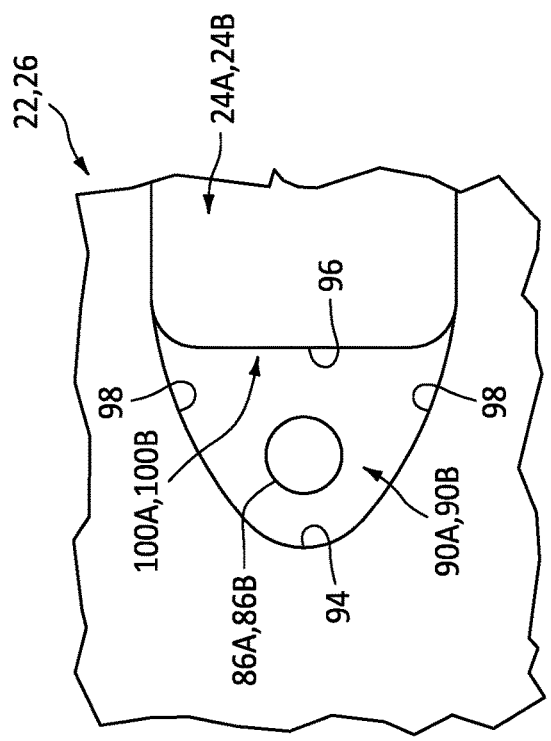

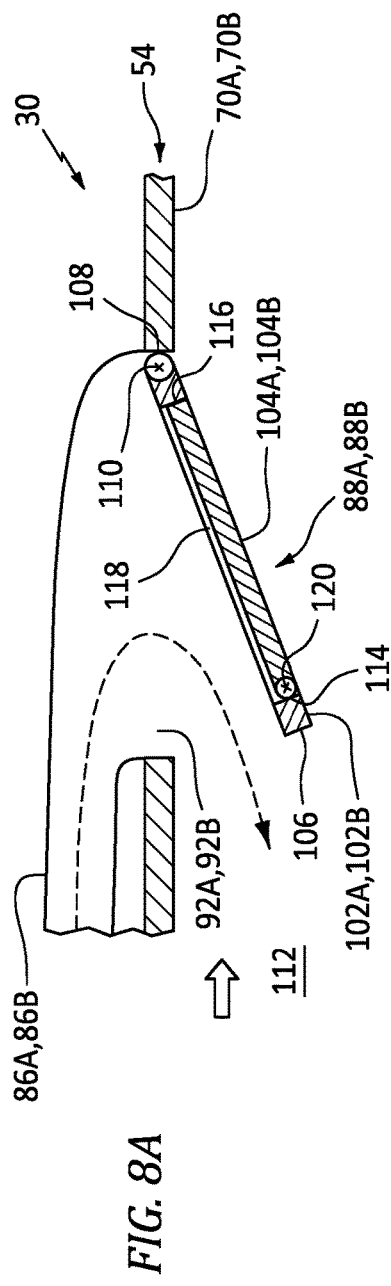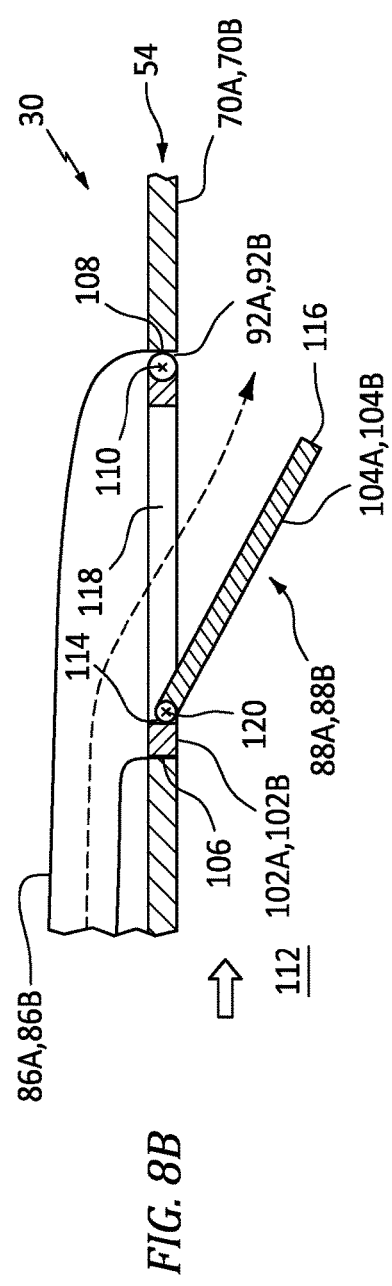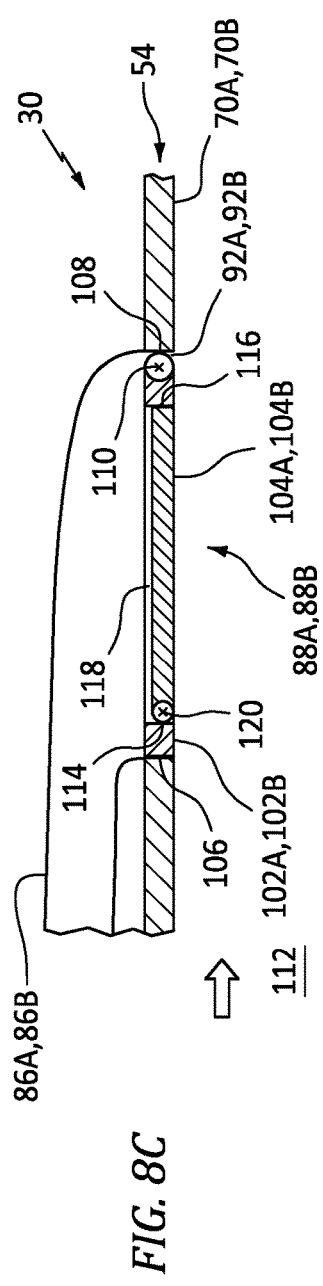

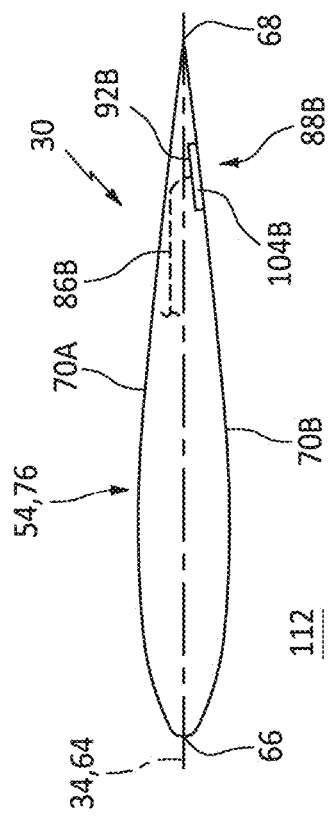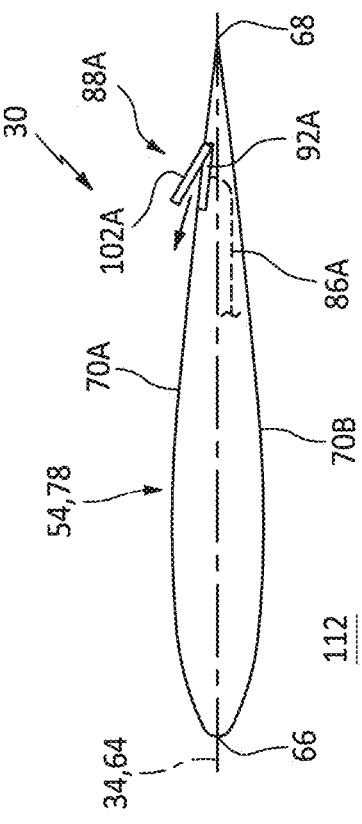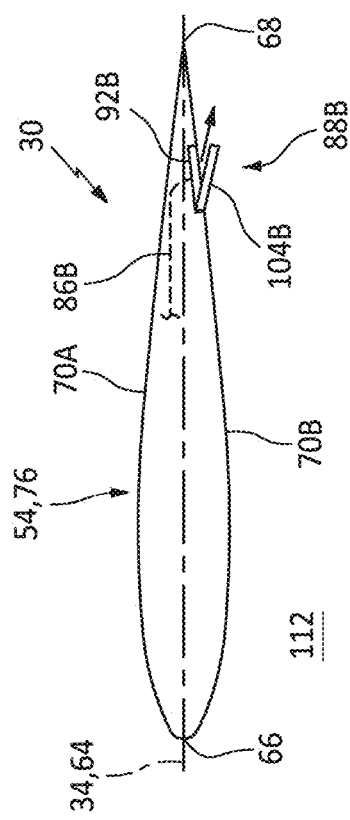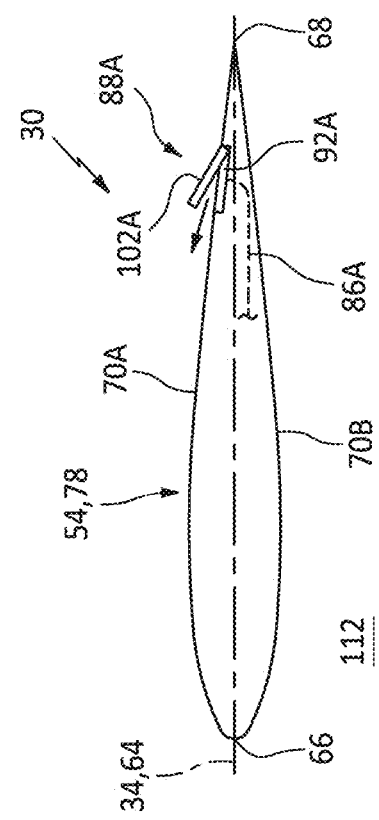
FIG. 9B2
FIG. 9B1
FIG. 9A2
FIG. 9A1

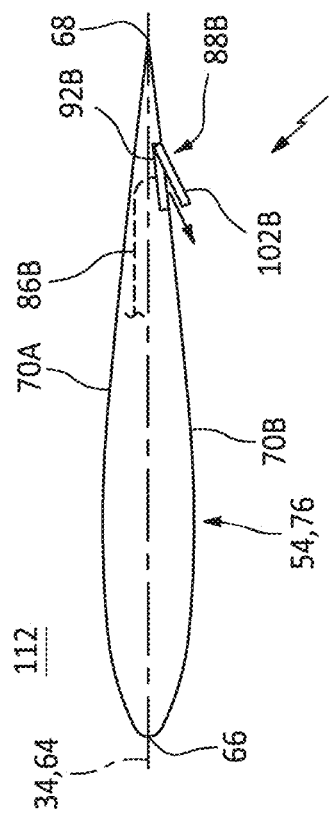
FIG. 9D2
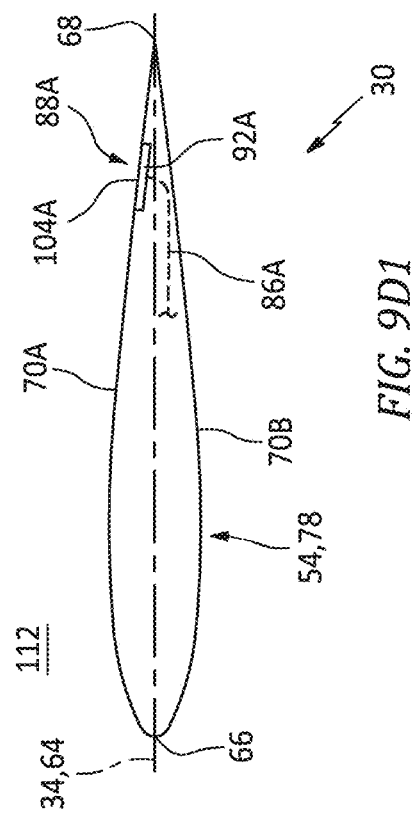
FIG. 9D1
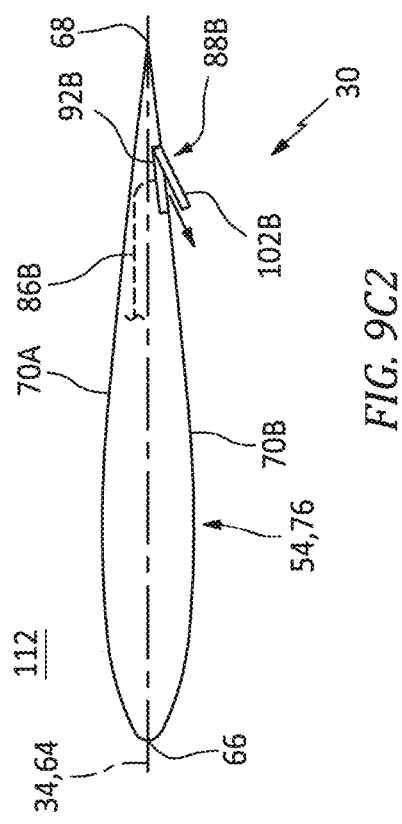
FIG. 9C2
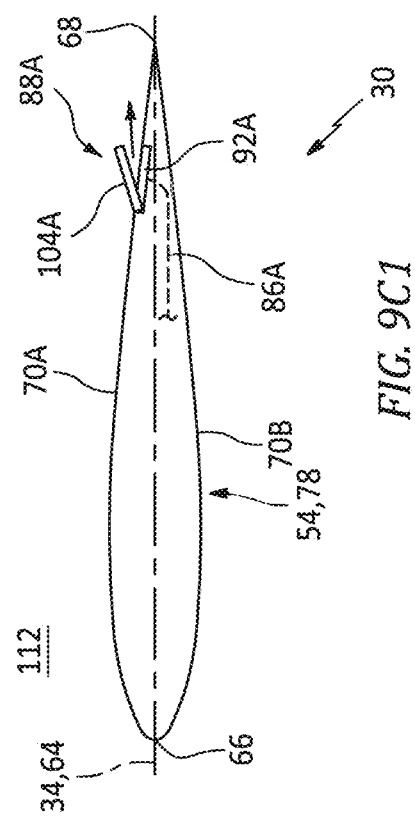
FIG. 9C1

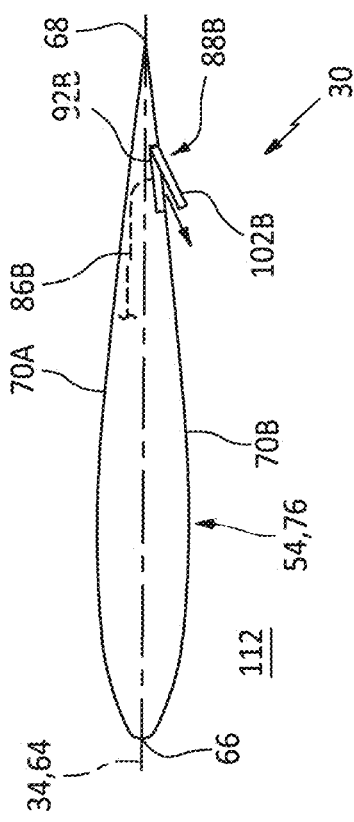
FIG. 9F2
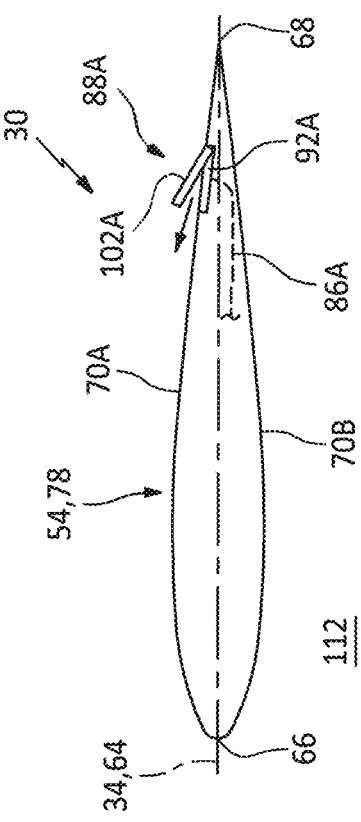
FIG. 9F1
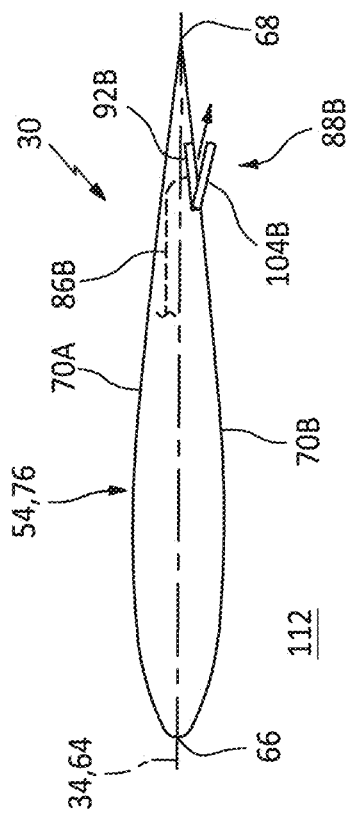
FIG. 9E2
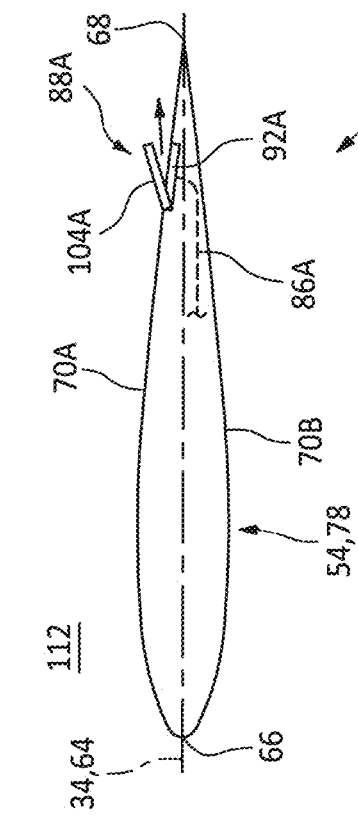
FIG. 9E1

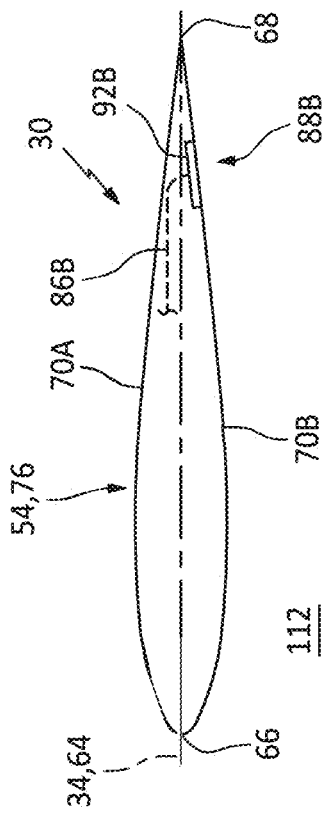
FIG. 9G2
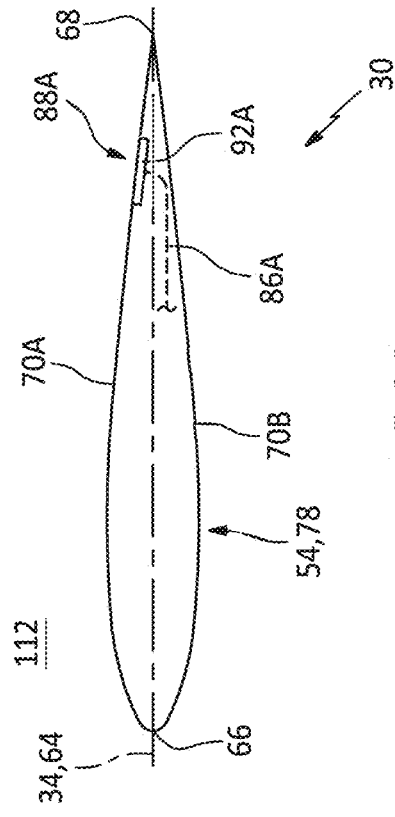
FIG. 9G1

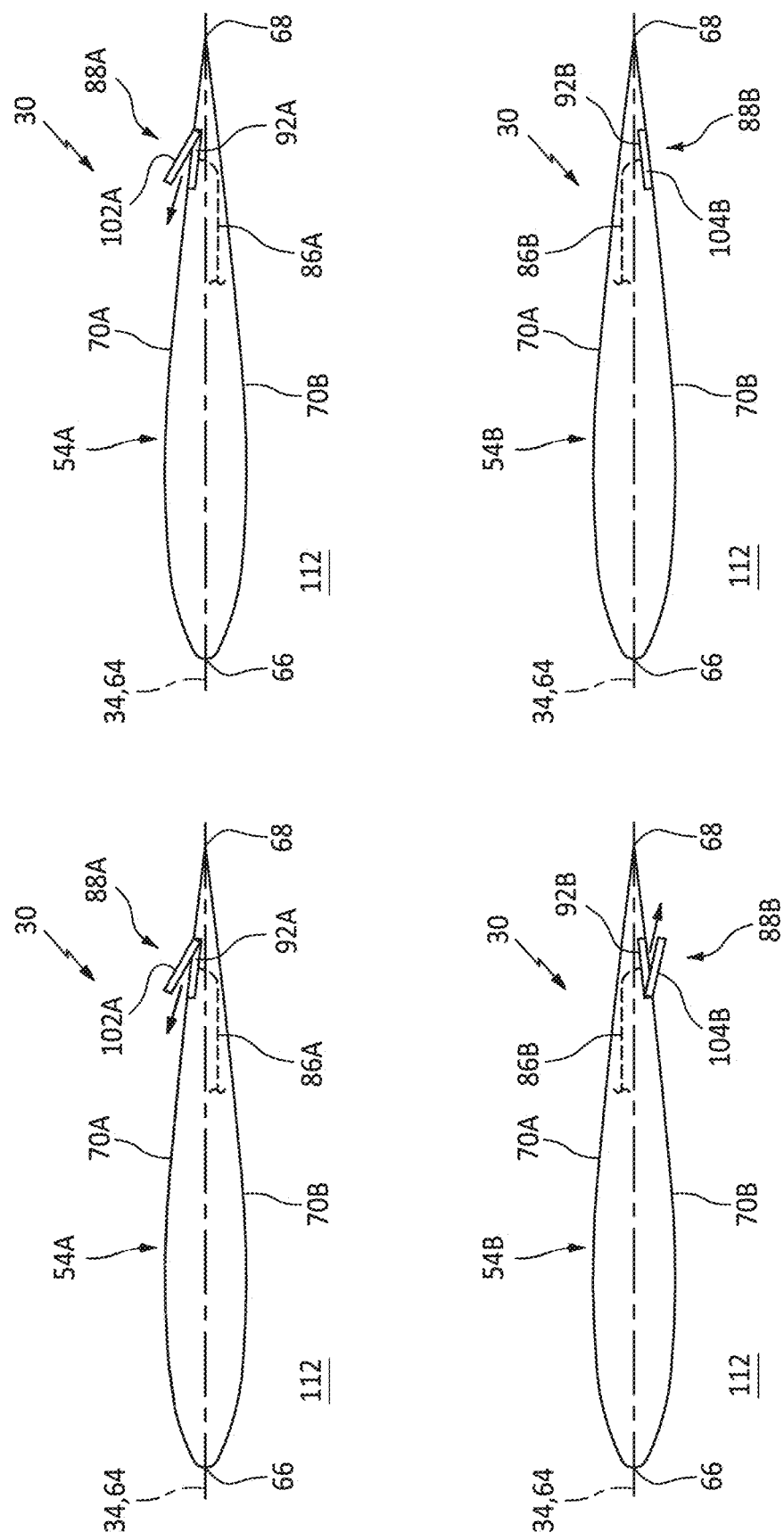

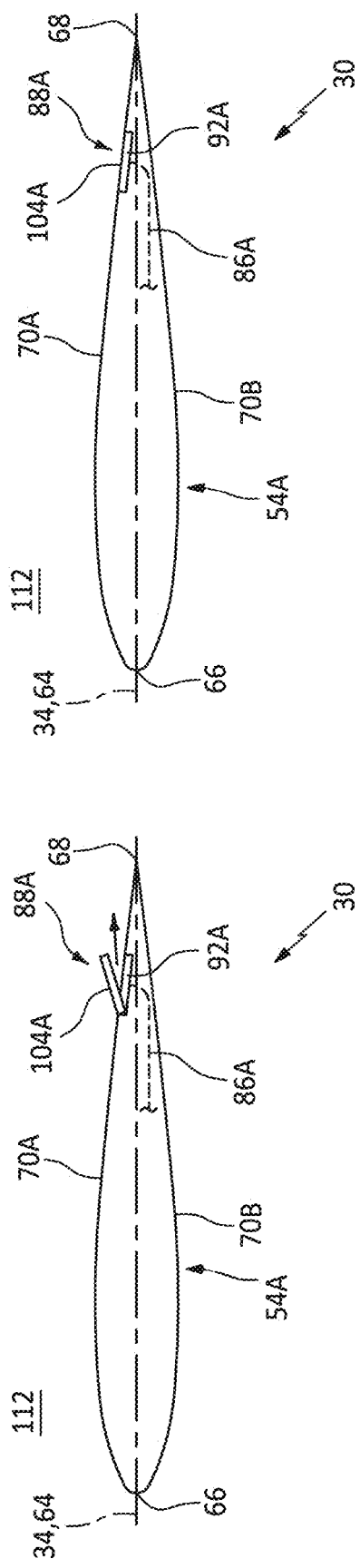
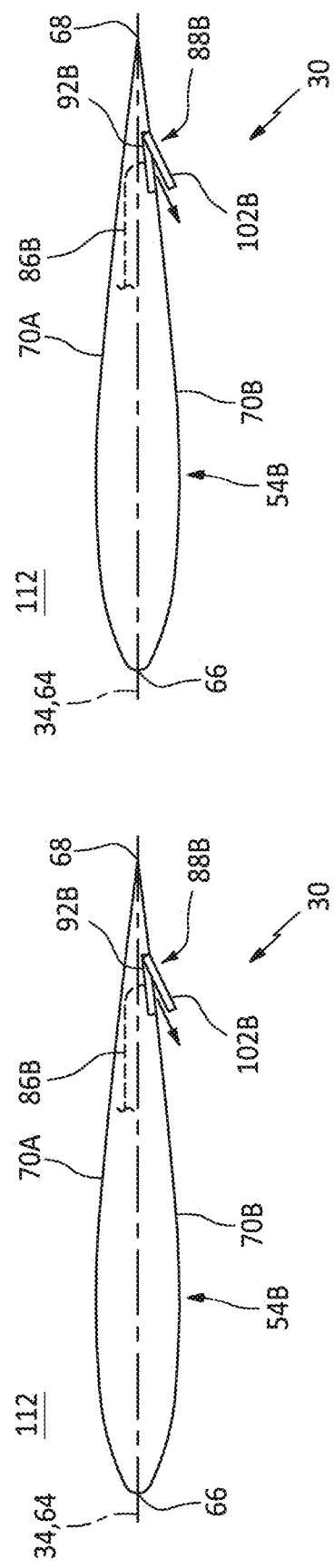
FIG. 11C
FIG. 11D

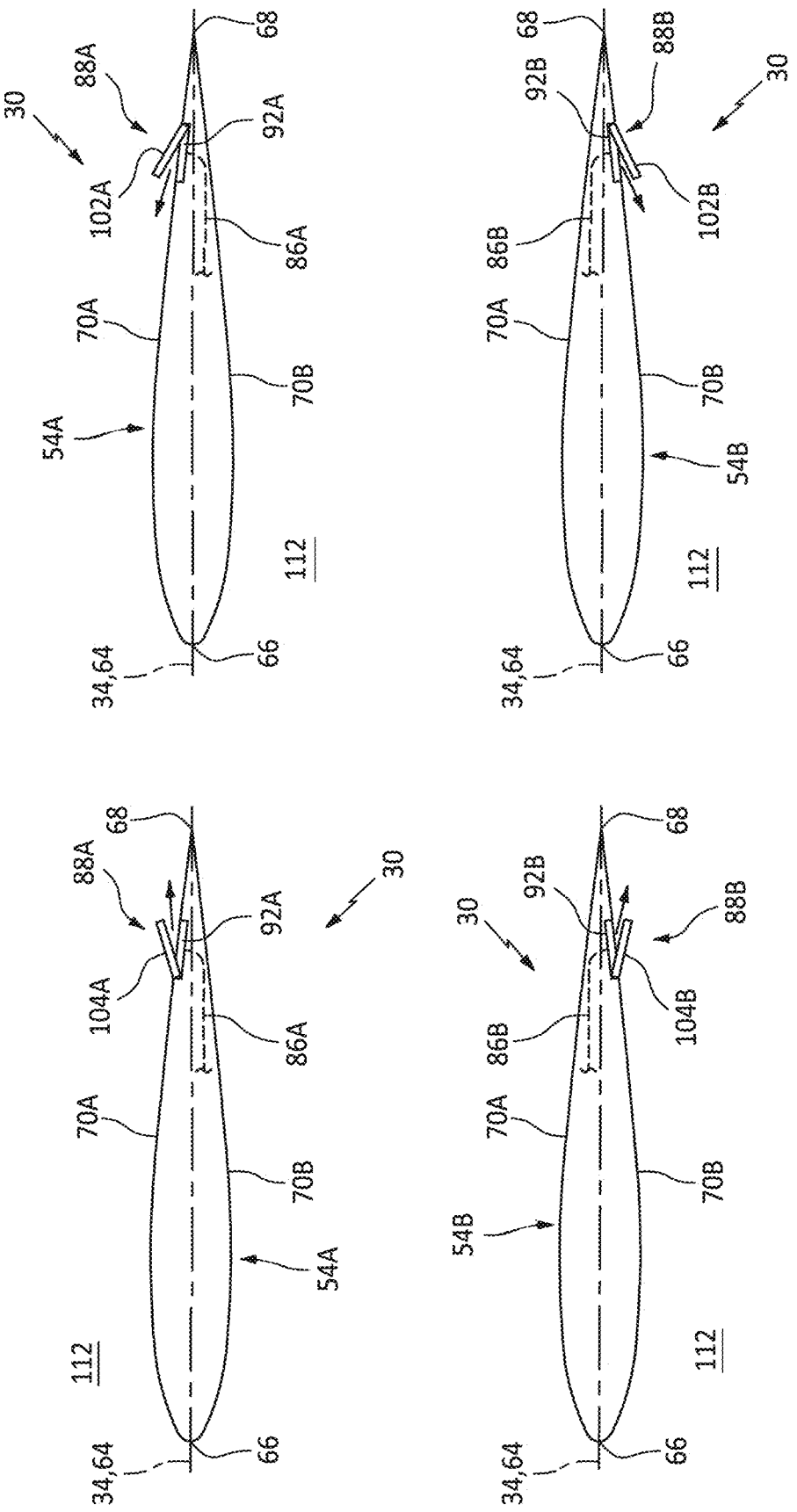

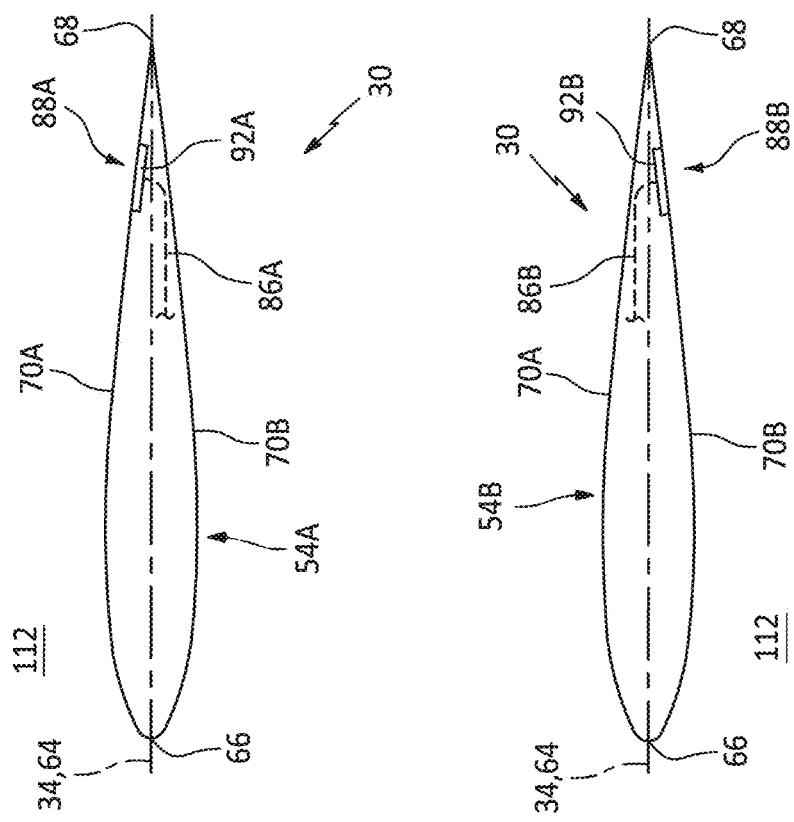

AIRCRAFT AIRFRAME COMPONENT WITH AIR SYSTEM

BACKGROUND OF THE DISCLOSURE

1. Technical Field

This disclosure relates generally to an aircraft and, more particularly, to an airframe component of the aircraft such as a vertical stabilizer.

2. Background Information

An aircraft may include a vertical stabilizer at an aft, downstream end of the aircraft. Various types and configurations of aircraft and vertical stabilizers are known in the art. While these known aircraft and vertical stabilizers have various benefits, there is still room in the art for improvement.

SUMMARY OF THE DISCLOSURE

According to an aspect of the present disclosure, a system is provided for an aircraft. This system includes a vane and an air system. The vane extends spanwise from a base to a tip. The vane extends longitudinally from a leading edge to a trailing edge. The vane extends laterally between a first side and a second side. The air system includes a first air circuit and a first door assembly. The first air circuit extends in the vane to a first circuit outlet at the first side. The first door assembly is arranged at the first circuit outlet. The air system is configured to exhaust a flow of air out of the first air circuit through the first circuit outlet during a first mode of operation and a second mode of operation. The first door assembly is configured to direct the flow of air exhausted from the first circuit outlet longitudinally towards the leading edge during the first mode of operation. The first door assembly is configured to direct the flow of air exhausted from the first circuit outlet longitudinally towards the trailing edge during the second mode of operation.

According to another aspect of the present disclosure, another system is provided for an aircraft. This system includes a vane and an air system. The vane extends spanwise from a base to a tip. The vane extends longitudinally from a leading edge to a trailing edge. The vane extends laterally between a first side and a second side. The air system includes a first air circuit, a second air circuit, a first door assembly and a second door assembly. The first air circuit extends in the vane to a first circuit outlet at the first side. The first door assembly is configured to regulate flow through the first circuit outlet. The second air circuit extends in the vane to a second circuit outlet at the second side. The second door assembly is configured to regulate flow through the second circuit outlet.

According to another aspect of the present disclosure, another system is provided for an aircraft. This system includes an airframe, a first powerplant, a second powerplant and an air system. The first powerplant is connected to the airframe. The first powerplant includes a first powerplant inlet. The second powerplant is connected to the airframe. The second powerplant includes a second powerplant inlet. The air system includes a first air circuit, a first door assembly, a second air circuit and a second door assembly. The first air circuit extends within the airframe between a first circuit inlet and a first circuit outlet. The first circuit inlet laterally overlaps and is upstream of the first powerplant inlet. The first door assembly is arranged at the first circuit outlet. The second air circuit extends within the airframe between a second circuit inlet and a second circuit outlet. The second circuit inlet laterally overlaps and is upstream of the second powerplant inlet. The second door assembly is arranged at the second circuit outlet. The air system is configured to exhaust a first flow of air out of the first air circuit through the first circuit outlet and a second flow of air out of the second air circuit through the second circuit outlet.

According to still another aspect of the present disclosure, another system is provided for an aircraft. This system includes an airframe, a powerplant and an air system. The powerplant is connected to the airframe. The powerplant includes a powerplant inlet. The air system includes a first air circuit and a first door assembly. The first air circuit extends within the airframe between a first circuit inlet and a first circuit outlet. The first circuit inlet laterally overlaps and is upstream of the powerplant inlet. The first door assembly is arranged at the first circuit outlet. The air system is configured to exhaust a flow of air out of the first air circuit through the first circuit outlet during a first mode of operation and a second mode of operation. The first door assembly is configured to direct the flow of air exhausted from the first circuit outlet in an upstream direction during the first mode of operation. The first door assembly is configured to direct the flow of air exhausted from the first circuit outlet in a downstream direction during the second mode of operation.

The airframe may include a body and a vane projecting out from the body. The powerplant may be connected to the body. The first circuit outlet may be disposed in the vane.

The airframe may include a body. The powerplant may be connected to the body. The first circuit outlet may be disposed in the body downstream of the powerplant.

The first door assembly may be configured to direct a first flow of air, exhausted from the first air circuit through the first circuit outlet, longitudinally towards the leading edge during a first mode of operation. The second door assembly may be configured to direct a second flow of air, exhausted from the second air circuit through the second circuit outlet, longitudinally towards the trailing edge during the first mode of operation. In addition or alternatively, the first door assembly may be configured to direct the first flow of air, exhausted from the first air circuit through the first circuit outlet, longitudinally towards the trailing edge during a second mode of operation. The second door assembly may be configured to direct the second flow of air, exhausted from the second air circuit through the second circuit outlet, longitudinally towards the leading edge during the second mode of operation.

The first door assembly may be configured to direct a first flow of air, exhausted from the first air circuit through the first circuit outlet, longitudinally towards the leading edge during a mode of operation. The second door assembly may be configured to direct a second flow of air, exhausted from the second air circuit through the second circuit outlet, longitudinally towards the leading edge during the mode of operation.

The first door assembly may be configured to direct a first flow of air, exhausted from the first air circuit through the first circuit outlet, longitudinally towards the trailing edge during a mode of operation. The second door assembly may be configured to direct a second flow of air, exhausted from the second air circuit through the second circuit outlet, longitudinally towards the trailing edge during the mode of operation.

During a mode of operation, the first door assembly may be configured to close the first circuit outlet and the second door assembly may be configured to close the second circuit outlet.

The first door assembly may be configured to block the first circuit outlet during a third mode of operation.

The first door assembly may include a first door extending longitudinally along the first side between an upstream end and a downstream end. The first door may be configured to laterally displace the upstream end from the first side during the first mode of operation. The first door may be configured to laterally displace the downstream end from the first side during the second mode of operation.

The first door assembly may include a first door. The first door may be configured to pivot about a first axis to enter the first mode of operation. The first door may be configured to pivot about a second axis to enter the second mode of operation. The second axis may be upstream of the first axis longitudinally along the first side.

The first door assembly may be disposed longitudinally along the first side closer to the trailing edge than the leading edge.

The system may also include an airframe, and the airframe may include a body and the vane connected to the body at the base. The first air circuit may extend within the airframe from a first circuit inlet to the first circuit outlet. The first circuit inlet may be arranged with the body.

The first circuit inlet may be laterally offset from the vane.

The body may be configured as a blended wing body.

The system may also include a first powerplant. The first powerplant may include a powerplant inlet and may be connected to the body. The circuit inlet may be disposed upstream of and may laterally overlap the powerplant inlet.

The first powerplant may be configured as a propulsion system for the aircraft.

The system may also include a second powerplant connected to the body. The vane may longitudinally overlap and may be disposed laterally between the first powerplant and the second powerplant.

The air system may include a second air circuit and a second door assembly. The second air circuit may extend in the vane to a second circuit outlet at the second side. The second door assembly may be arranged at the second circuit outlet. The air system may be configured to exhaust a second flow of air out of the second air circuit through the second circuit outlet during the first mode of operation and the second mode of operation. The second door assembly may be configured to direct the second flow of air exhausted from the second circuit outlet longitudinally towards the trailing edge during the first mode of operation. The second door assembly may be configured to direct the second flow of air exhausted from the second circuit outlet longitudinally towards the leading edge during the second mode of operation.

The second door assembly may be spanwise offset from the first door assembly along the vane.

The second door assembly may be longitudinally aligned with the first door assembly along the vane.

During a third mode of operation, the first door assembly may be configured to close the first circuit outlet and the second door assembly may be configured to close the second circuit outlet.

The air system may also be configured to exhaust the flow of air out of the first air circuit through the first circuit outlet during a third mode of operation. The first door assembly may be configured to direct the flow of air exhausted from the first circuit outlet longitudinally towards the leading edge during the third mode of operation. The air system may also be configured to exhaust the second flow of air out of the second air circuit through the second circuit outlet during the third mode of operation. The second door assembly may be configured to direct the second flow of air exhausted from the second circuit outlet longitudinally towards the leading edge during the third mode of operation.

The air system may also be configured to exhaust the flow of air out of the first air circuit through the first circuit outlet during a third mode of operation. The first door assembly may be configured to direct the flow of air exhausted from the first circuit outlet longitudinally towards the trailing edge during the third mode of operation. The air system may also be configured to exhaust the second flow of air out of the second air circuit through the second circuit outlet during the third mode of operation. The second door assembly may be configured to direct the second flow of air exhausted from the second circuit outlet longitudinally towards the trailing edge during the third mode of operation.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 4A is a partial side view illustration of a section of the aircraft along a first side of a vertical stabilizer.

FIG. 4B is a partial side view illustration of a section of the aircraft along a second side of the vertical stabilizer.

FIG. 6 is a partial sectional illustration of a portion of the aircraft at an interface between an air circuit and a propulsion system.

FIG. 7 is a plan view illustration of a portion of the aircraft at the interface between the air circuit and the propulsion system.

FIGS. 8A-C are partial sectional illustrations of the vertical stabilizer with a door assembly in various positions.

FIG. 9A1 is a partial schematic sectional illustration of an outer span section of the vertical stabilizer with an air system operating in a mode of operation.

FIG. 9A2 is a partial schematic sectional illustration of an inner span section of the vertical stabilizer with an air system operating in a mode of operation.

FIG. 9B1 is a partial schematic sectional illustration of an outer span section of the vertical stabilizer with an air system operating in a mode of operation.

FIG. 9B2 is a partial schematic sectional illustration of an inner span section of the vertical stabilizer with an air system operating in a mode of operation.

FIG. 9C1 is a partial schematic sectional illustration of an outer span section of the vertical stabilizer with an air system operating in a mode of operation.

FIG. 9C2 is a partial schematic sectional illustration of an inner span section of the vertical stabilizer with an air system operating in a mode of operation.

FIG. 9D1 is a partial schematic sectional illustration of an outer span section of the vertical stabilizer with an air system operating in a mode of operation.

FIG. 9D2 is a partial schematic sectional illustration of an inner span section of the vertical stabilizer with an air system operating in a mode of operation.

FIG. 9E1 is a partial schematic sectional illustration of an outer span section of the vertical stabilizer with an air system operating in a mode of operation.

FIG. 9E2 is a partial schematic sectional illustration of an inner span section of the vertical stabilizer with an air system operating in a mode of operation.

FIG. 9F1 is a partial schematic sectional illustration of an outer span section of the vertical stabilizer with an air system operating in a mode of operation.

FIG. 9F2 is a partial schematic sectional illustration of an inner span section of the vertical stabilizer with an air system operating in a mode of operation.

FIG. 9G1 is a partial schematic sectional illustration of an outer span section of the vertical stabilizer with an air system operating in a mode of operation.

FIG. 9G2 is a partial schematic sectional illustration of an inner span section of the vertical stabilizer with an air system operating in a mode of operation.

FIGS. 11A-G are partial schematic sectional illustrations of the vertical stabilizer of FIG. 10 with its air system operating in various modes of operation.

DETAILED DESCRIPTION

Figure 1:
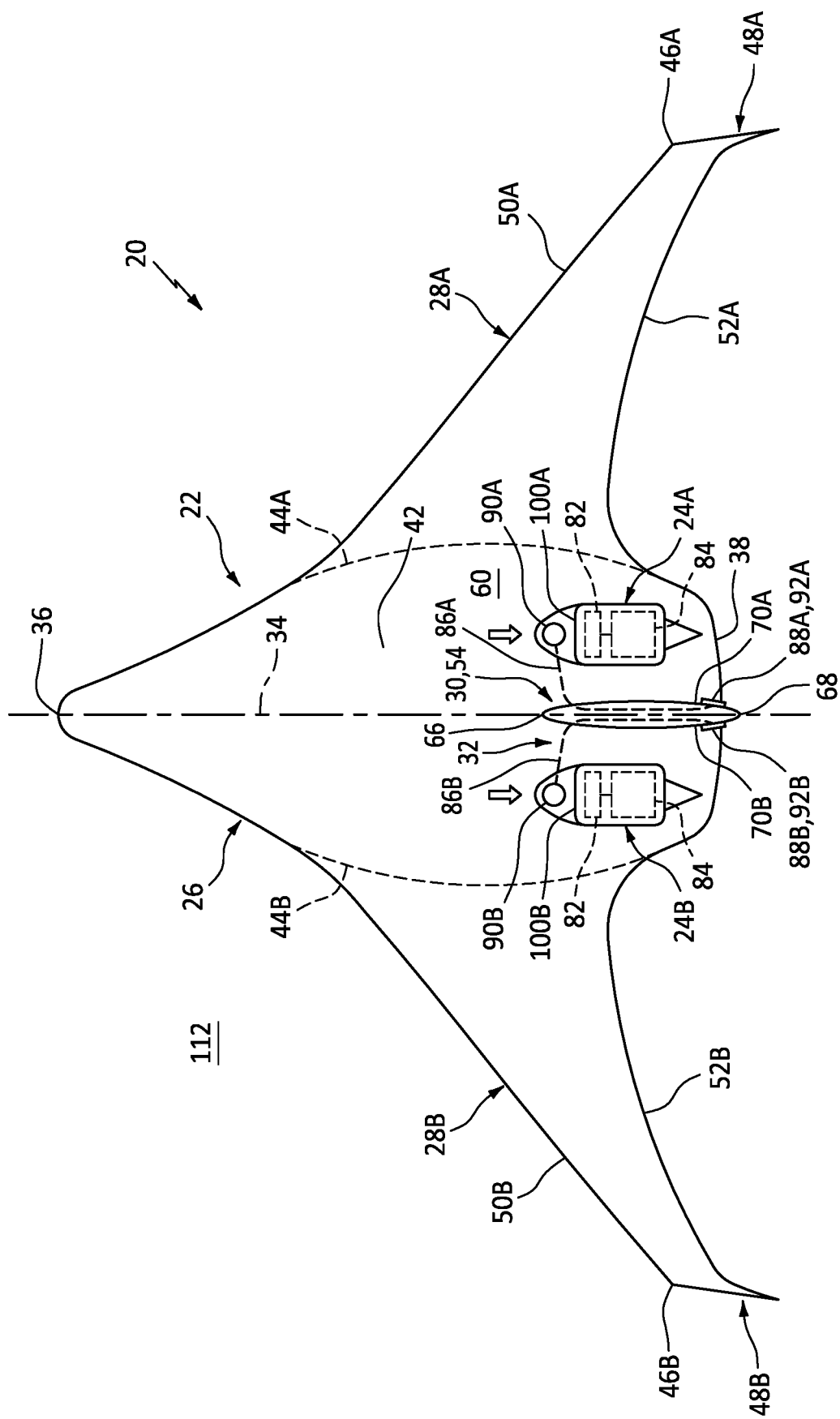
FIG. 1 is a plan view illustration of an aircraft.

FIG. 1 illustrates a blended wing body (BWB) aircraft 20. This aircraft 20 includes an airframe 22 and one or more propulsion systems 24A and 24B (generally referred to as "24"). The aircraft airframe 22 includes a body 26 (e.g., a fuselage), one or more wings 28A and 28B (generally referred to as "28") and a vertical stabilizer 30. The aircraft 20 also includes an air system 32 for the vertical stabilizer 30.

Figure 2:
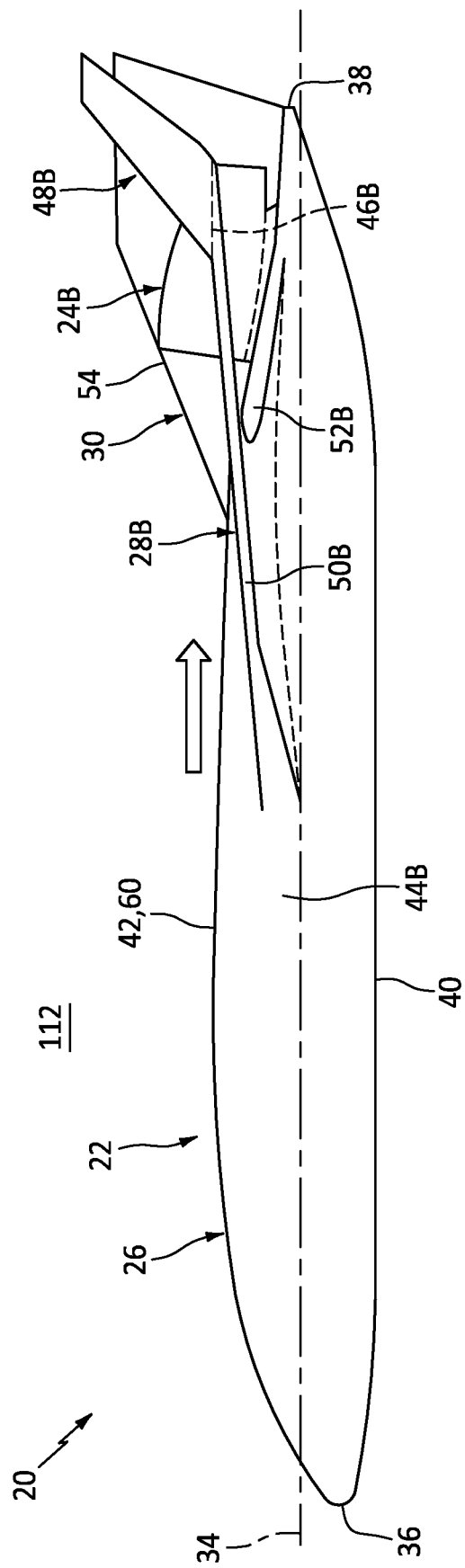
FIG. 2 is a side view illustration of the aircraft.
Figure 3:
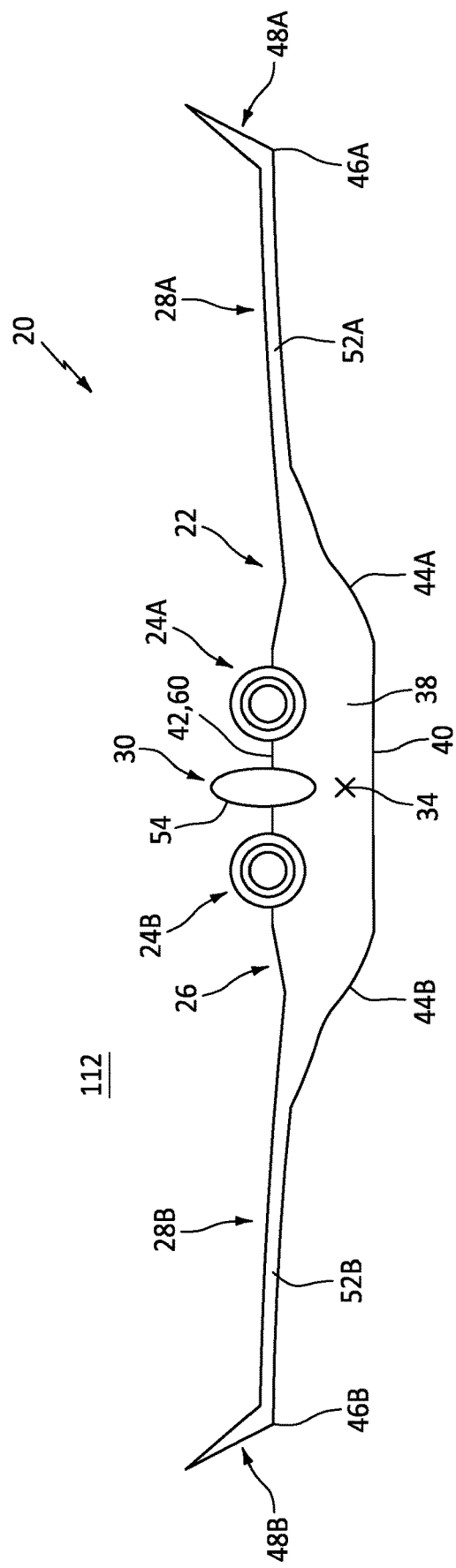
FIG. 3 is a rear end view illustration of the aircraft.

The aircraft body 26 extends longitudinally along a centerline 34 between and to a forward, upstream end 36 and an aft, downstream end 38 of the aircraft body 26. This centerline 34 may be a centerline axis of the aircraft 20, the aircraft airframe 22 and/or the aircraft body 26. Referring to FIG. 2, the centerline 34 may be substantially (e.g., within +/−five or ten degrees) or completely parallel with a horizon line when the aircraft 20 is flying in level flight. The aircraft body 26 extends vertically between and to opposing vertical bottom and top sides 40 and 42 of the aircraft body 26. The body bottom side 40 is vertically below the body top side 42 with respect to a gravitational direction when the aircraft 20 is flying in level flight. Referring to FIGS. 1 and 3, the aircraft body 26 extends laterally between and to opposing lateral sides 44A and 44B (generally referred to as "44") of the aircraft body 26.

The aircraft wings 28 of FIGS. 1 and 3 are arranged to the opposing lateral sides 44 of the aircraft body 26. Each of the aircraft wings 28 is connected to (e.g., fixed to) the aircraft body 26. Each of the aircraft wings 28A, 28B projects spanwise along a span line of the respective aircraft wing 28A, 28B out from the aircraft body 26, at the respective body lateral side 44A, 44B, to a distal tip 46A, 46B of the respective aircraft wing 28. At the wing tip 46A, 46B, the respective aircraft wing 28 may (or may not) be configured with a winglet 48A, 48B. Each of the aircraft wings 28 of FIG. 1 extends longitudinally along a mean line of the respective aircraft wing 28 from a leading edge 50A, 50B (generally referred to as "50") of the respective aircraft wing 28 to a trailing edge 52A, 52B (generally referred to as "52") of the respective aircraft wing 28. The wing leading edge 50 of FIG. 1, at a base of the respective aircraft wing 28, is longitudinally spaced aft, downstream from the body forward end 36. The wing trailing edge 52 of FIG. 1, at the wing base, is longitudinally spaced forward, upstream from the body aft end 38. The present disclosure, however, is not limited to such an exemplary aircraft wing arrangement.

The vertical stabilizer 30 of FIGS. 1 and 3 is disposed along the body top side 42. This vertical stabilizer 30 is arranged laterally between the aircraft propulsion systems 24 longitudinally at (e.g., on, adjacent or proximate) the body aft end 38. Referring to FIGS. 4A and 4B, the vertical stabilizer 30 is configured as or may otherwise include a stationary vane 54.

Figure 5A:
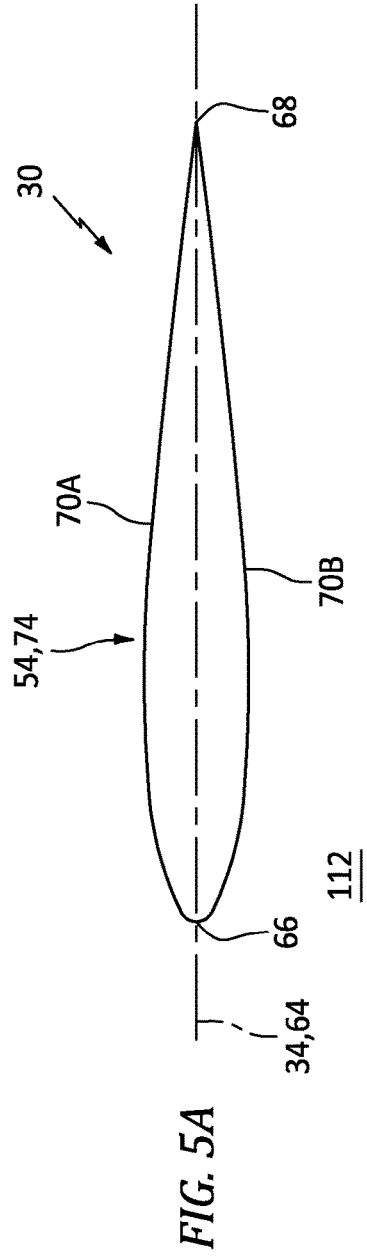
FIGS. 5A-C are partial schematic sectional illustrations of the vertical stabilizer at various span locations.
Figure 5B:
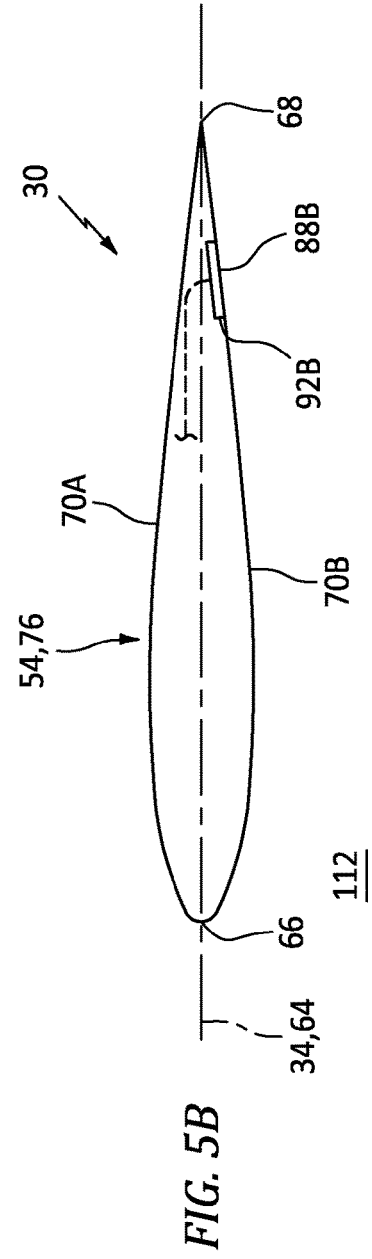
Figure 5C:
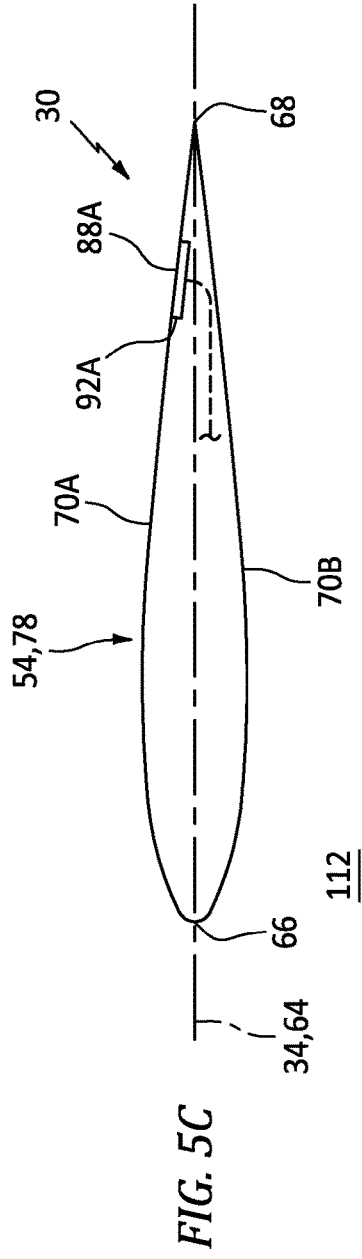

The vane 54 is connected to (e.g., fixed to) the aircraft body 26 at the body top side 42. This vane 54 projects spanwise along a span line of the vane 54 (e.g., vertically) away from the aircraft body 26 and its body top side 42. More particularly, the vane 54 of FIGS. 4A and 4B projects spanwise out from an exterior surface 60 (e.g., an outermost aero surface) of the aircraft body 26 at the body top side 42 to a distal tip 62 of the vane 54. The vane 54 extends longitudinally along a mean line 64 (e.g., a chord line where the vane 54 is symmetrical) of the vane 54 from a leading edge 66 of the vane 54 to a trailing edge 68 of the vane 54. Referring to FIGS. 5A-C, the vane 54 extends laterally (e.g., perpendicular to the mean line 64) between and to opposing lateral sides 70A and 70B (generally referred to as "70") of the vane 54. These vane lateral sides 70 extend longitudinally along the mean line 64 between and meet at the vane leading edge 66 and the vane trailing edge 68. Referring to FIGS. 4A and 4B, each of the vane elements 66, 68, 70A and 70B extends spanwise from a base 72 of the vane 54 at the body top side 42 to the vane tip 62.

The vane 54 of FIGS. 4A and 4B includes a base portion 74, an inner portion 76 and an outer portion 78. The base portion 74 may form a (e.g., complete) spanwise extending section of the vane 54 spanwise adjacent the aircraft body 26. The inner portion 76 may form a (e.g., complete) spanwise extending section of the vane 54 spanwise between the base portion 74 and the outer portion 78 of the vane 54. The inner portion 76 of FIGS. 4A and 4B, for example, extends spanwise from (or about) the base portion 74 to (or towards) the outer portion 78. The outer portion 78 may form a (e.g., complete) spanwise extending section of the vane 54 spanwise adjacent or near the vane tip 62. At one, some or all locations along each of the vane portions 74, 76, 78, referring to FIGS. 5A-5C, the vane mean line 64 of the respective vane portion 74, 76, 78 may be arranged parallel with the centerline 34. The vane mean line 64 may also be laterally aligned with the centerline 34. The present disclosure, however, is not limited to such an exemplary (e.g., zero-camber and/or zero stagger) vane arrangement.

Referring to FIG. 1, each of the aircraft propulsion systems 24 is connected to (e.g., fixed to) the aircraft body 26 at the body top side 42 and the body aft end 38. These aircraft propulsion systems 24 are arranged to the opposing lateral sides 70 of the vertical stabilizer 30 and its vane 54. The first propulsion system 24A of FIG. 1, for example, is spaced laterally from the vane 54 and its vane base 72 (see FIGS. 4A and 4B) at the vane first side 70A by a lateral first distance. The second propulsion system 24B of FIG. 1 is spaced laterally from the vane 54 and its vane base 72 (see FIGS. 4A and 4B) at the vane second side 70B by a lateral second distance, which may be equal to the first distance. The vane 54 may thereby be arranged laterally midway between the first propulsion system 24A and the second propulsion system 24B. The vane 54 of FIG. 1 may also longitudinally overlap a portion or an entirety of each aircraft propulsion system 24 along the centerline 34. The vane 54 thereby provides a divider (e.g., a structural barrier and/or a flow separator) laterally between the first propulsion system 24A and the second propulsion system 24B. This divider may reduce effects of crosswinds on the aircraft propulsion systems 24 and/or may prevent other disruptions associated with the aircraft propulsion systems 24 being in close proximity, such as reducing a likelihood of bird ingestion into both aircraft propulsion systems 24 as well as facilitating noise reduction (e.g., provide additional surfaces for acoustic attenuation). Here, the vane leading edge 66 of FIG. 1 is disposed longitudinally forward, upstream of each aircraft propulsion system 24 along the centerline 34.

Each aircraft propulsion system 24 of FIG. 1 is configured as a ducted rotor propulsion system. Examples of the ducted rotor propulsion system include, but are not limited to, a turbofan propulsion system and a turbojet propulsion system. Each aircraft propulsion system 24 of FIG. 1, for example, includes a ducted bladed rotor 82 (e.g., a fan rotor, a first stage compressor rotor, etc.) rotationally driven by an aircraft powerplant 84. This aircraft powerplant 84 may be configured as or otherwise include a turbine engine powered by traditional fuels or alternative fuels (e.g., sustainable aviation fuel, liquid hydrogen, etc.). Alternatively, the aircraft powerplant 84 may be configured as or otherwise include a rotary engine (e.g., a Wankel cycle engine), a hybrid-electric engine, or any other internal combustion (IC) engine or electric motor operable to drive rotation of the bladed rotor 82. The present disclosure, however, is not limited to the foregoing exemplary aircraft propulsion system and/or powerplant types or configurations. It is contemplated, for example, each aircraft propulsion system 24 may alternatively be configured as an open rotor propulsion system. Examples of the open rotor propulsion include, but are not limited to, a pusher fan propulsion system and a propfan propulsion system.

The air system 32 of FIG. 1 includes one or more air circuits 86A and 86B (generally referred to as "86") and one or more door assemblies 88A and 88B (generally referred to as "88"). For ease of description, the air circuits 86 are described below as fluidly discrete air circuits. The air circuits 86 of FIG. 1, for example, are not fluidly coupled together along their lengths. It is contemplated, however, the air circuits 86 may alternatively be fluidly coupled at one or more locations along their lengths in other embodiments.

Each air circuit 86A, 86B of FIG. 1 includes a circuit inlet 90A, 90B (generally referred to as "90") and a circuit outlet 92A, 92B (generally referred to as "92"). Each air circuit 86 extends within the airframe 22 from its respective circuit inlet 90 to its respective circuit outlet 92. An upstream section of each air circuit 86 of FIG. 1, for example, extends within the aircraft body 26 from its respective circuit inlet 90 to a downstream section of the respective air circuit 86. The downstream section of each air circuit 86 of FIG. 1 extends within the vane 54 from the respective upstream section of the respective air circuit 86 to its respective circuit outlet 92.

Each circuit inlet 90 is arranged with the aircraft body 26. Referring to FIG. 6, each circuit inlet 90 may be configured as a recess such as a dimple, a depression, a channel, a notch or the like in the aircraft body 26. The circuit inlet 90 of FIG. 6, for example, projects partially vertically into the aircraft body 26 from the body exterior surface 60. The circuit inlet 90 of FIG. 6 extends longitudinally within the aircraft body 26 and its body exterior surface 60 between opposing longitudinal ends 94 and 96 of the circuit inlet 90. The circuit inlet 90 of FIG. 7 extends laterally within the aircraft body 26 and its body exterior surface 60 between opposing lateral sides 98 of the circuit inlet 90. The present disclosure, however, is not limited to such an exemplary circuit inlet configuration. Each circuit inlet 90, for example, may alternatively be configured as a scoop which projects vertically out from the aircraft body 26 and its exterior surface 60. In another example, each circuit inlet 90 may be configured as a flush mount scoop such as a NACA type inlet.

Referring to FIG. 1, each circuit inlet 90 is laterally offset (e.g., located remote) from the vertical stabilizer 30 and its vane 54. The first circuit inlet 90A of FIG. 1, for example, is disposed to the vane first side 70A and laterally spaced from the vane 54 and its vane first side 70A by a lateral first distance. This first distance may be selected such that the first circuit inlet 90A is disposed upstream of an airflow inlet 100A into the first propulsion system 24A and its powerplant 84. The first circuit inlet 90A of FIG. 1, for example, laterally overlaps (e.g., is laterally aligned with) the first propulsion system 24A and its airflow inlet 100A; see also FIG. 7. Similarly, the second circuit inlet 90B of FIG. 1 is disposed to the vane second side 70B and laterally spaced from the vane 54 and its vane second side 70B by a lateral second distance. This second distance may be selected such that the second circuit inlet 90B is disposed upstream of an airflow inlet 100B into the second propulsion system 24B and its powerplant 84. The second circuit inlet 90B of FIG. 1, for example, laterally overlaps (e.g., is laterally aligned with) the second propulsion system 24B and its airflow inlet 100B; see also FIG. 7.

Each circuit outlet 92 of FIG. 1 is arranged with the vertical stabilizer 30 and its vane 54. Each circuit outlet 92A, 92B of FIG. 1, for example, is arranged in and along a respective one of the vane sides 70A, 70B. More particularly, the circuit outlets 92A and 92B are arranged to the opposing lateral sides 70A, 70B of the vane 54. For example, referring to FIGS. 4A and 5C, the first circuit outlet 92A is arranged along the vane first side 70A in the outer portion 78. Referring to FIGS. 4B and 5B, the second circuit outlet 92B is arranged along the vane second side 70B in the inner portion 76. With this arrangement, the first circuit outlet 92A (see FIG. 4A) is located radially outboard of the second circuit outlet 92B (see FIG. 4B) along the span of the vane 54.

Referring to FIGS. 4A and 4B, the circuit outlets 92 may be longitudinally aligned along the vane 54 and/or the centerline 34 (see also FIG. 1). Each circuit outlet 92A, 92B may be disposed longitudinally along the respective vane side 70A, 70B closer to the vane trailing edge 68 than the vane leading edge 66. Each circuit outlet 92A, 92B of FIG. 4A, 4B, for example, may be located along a downstream most (e.g., one-half, one-third, one-quarter) section of the respective vane side 70A, 70B towards the vane trailing edge 68.

Referring to FIG. 5B, 5C, each door assembly 88A, 88B is arranged at a respective one of the circuit outlets 92A, 92B. Referring to FIGS. 8A-C, each door assembly 88 may be configured as a multi-pivot axis door. Each door assembly 88A, 88B of FIGS. 8A-C, for example, includes an outer door 102A, 102B (generally referred to as "102") and an inner door 104A, 104B (generally referred to as "104").

The outer door 102 extends longitudinally between and to a forward, upstream end 106 of the outer door 102 and an aft, downstream end 108 of the outer door 102. This outer door 102 is arranged with (e.g., seated in or disposed adjacent) a respective one of the circuit outlets 92A, 92B along a respective one of the vane sides 70A, 70B. The outer door 102 is moveably mounted to the vane 54. The outer door 102 of FIGS. 8A-C, for example, is pivotally mounted to an internal support structure of the vane 54 at (or near) the outer door downstream end 108. With this arrangement, the outer door 102 is configured to pivot about a downstream pivot axis 110 of the respective door assembly 88 (and/or otherwise move) between a (e.g., fully) closed/stowed position of FIG. 8C (see also FIG. 8B) and an (e.g., fully) open/deployed position of FIG. 8A. Here, the outer door upstream end 106 is displaced laterally outward away from the respective vane side 70A, 70B and projects laterally into an environment 112 external to the vertical stabilizer 30 and its vane 54.

The inner door 104 extends longitudinally between and to a forward, upstream end 114 of the inner door 104 and an aft, downstream end 116 of the inner door 104. This inner door 104 is arranged with (e.g., seat in or disposed adjacent) a port 118 in the respective outer door 102. The inner door 104 is moveably mounted to the respective outer door 102. The inner door 104 of FIGS. 8A-C, for example, is pivotally mounted to the respective outer door 102 at (or near) the inner door upstream end 114. The outer door 102 may thereby form a frame for and extend around the inner door 104, which frame couples the inner door 104 to the vane 54 at a respective one of the circuit outlets 92A, 92B along a respective one of the vane sides 70A, 70B. With this arrangement, the inner door 104 is configured to pivot about an upstream pivot axis 120 of the respective door assembly 88 (and/or otherwise move) between a (e.g., fully) closed/stowed position of FIG. 8C (see also FIG. 8A) and an (e.g., fully) open/deployed position of FIG. 8B. Here, the inner door downstream end 116 is displaced laterally outward away from the respective vane side 70A, 70B (and the respective outer door 102) and projects laterally into the external environment 112. The upstream pivot axis 120 may be parallel with and spaced longitudinally from the downstream pivot axis 110.

Referring to FIGS. 8A-C, each door assembly 88 is configured to regulate (e.g., open, meter, close) airflow exhausted from the respective circuit outlet 92 into the external environment 112. Each door assembly 88 is also configured to guide (e.g., direct) the airflow exhausted from respective circuit outlet 92 into the external environment 112. For example, the outer door 102 may move from its closed position of FIG. 8C (or from the position illustrated in FIG. 8B) to its open position of FIG. 8A to open (e.g., uncover) the respective circuit outlet 92. Here, the inner door 104 may remain in its closed position (or be moved to its closed position) and, thus, move (e.g., pivot) with the respective outer door 102 to the arrangement of FIG. 8A. With this arrangement of FIG. 8A, the respective door assembly 88 and its doors 102 and 104 are configured to guide (e.g., direct) the airflow exhausted from the respective circuit outlet 92 along a forward, upstream trajectory; e.g., longitudinally towards the vane leading edge 66 of FIG. 5B, 5C. In another example, the inner door 104 may move from its closed position of FIG. 8C (or from the position illustrated in FIG. 8A) to its open position of FIG. 8B to open (e.g., uncover) the respective circuit outlet 92 via the respective outer door port 118. Here, the outer door 102 may remain in its closed position (or be moved to its closed position). With this arrangement of FIG. 8B, the respective door assembly 88 and inner door 104 are configured to guide (e.g., direct) the airflow exhausted from the respective circuit outlet 92 along an aft, downstream trajectory; e.g., longitudinally towards the vane trailing edge 68 of FIG. 5B, 5C. In still another example, the outer door 102 and/or the inner door 104 may each move to its closed position of FIG. 8C to block (e.g., obstruct) flow through the respective circuit outlet 92. In the closed arrangement of FIG. 8C, the door assembly 88 may be configured to substantially or completely fluidly decouple the respective air circuit 86 from the exterior environment 112. Though illustrated as transitioning from a closed position of FIG. 8C to an open position of either FIG. 8A or 8B, it is understood that the outer door 102 may be configured to only move to one of the illustrated open positions. That is, in some examples, the outer door 102 may be configured to transition between the closed position of FIG. 8C to the open position of FIG. 8A or the open position of FIG. 8B, but not both. In such examples, the outer door may be activated by either a downstream pivot axis 110 or an upstream pivot axis 120, but not both.

During operation of the air system 32 of FIG. 1, each circuit inlet 90 may receive boundary layer air flowing along a respective upstream portion of the body exterior surface 60. This boundary layer air is directed into the respective air circuit 86 through its circuit inlet 90. The air flows through each air circuit 86 to its respective circuit outlet 92 where that air is exhausted from the air system 32 into the external environment 112 through the respective circuit outlet 92 and the respective open door assembly 88 (e.g., see FIG. 8A or 8B). By removing the boundary layer air upstream of the aircraft propulsion systems 24, each aircraft propulsion system 24 may receive a substantially free stream of air (e.g., clean air, low turbulence air, etc.) at its airflow inlet 100. By placing the circuit outlets 92A and 92B along the vane sides 70A and 70B, movement of air within the external environment 112 along the vane 54 may facilitate a pumping effect of the air through the air circuits 86. With this arrangement, the air system 32 operates as a passive air system. The air system 32, for example, utilizes the flow of air along the aircraft 20 within the external environment 112 to power its operation. By contrast, an active air system may utilize a pump or a compressor to boost or facilitate air flow.

Exhausting the air from one or more of the circuit outlets 92A and 92B may also be utilized to facilitate aircraft maneuvering and/or alter aircraft performance during flight. The air system 32, for example, may be operated in various modes of operation, some of which operating modes are schematically exemplified in FIGS. 9A1-G2.

Referring to FIGS. 9A1 and 9A2, during a first (e.g., starboard, right side) yaw mode of operation, the outer door 102A of the first door assembly 88A may be moved to its open position (see FIG. 9A1; see also FIG. 8A) and the inner door 104B of the second door assembly 88B may be moved to its open position (see FIG. 9A2; see also FIG. 8B). Here, the air exhausted from the first circuit outlet 92A is forward, upstream of the air exhausted from the second circuit outlet 92B. The air exhausted from the first circuit outlet 92A therefore initially may flow along a portion of the vane 54 with a greater lateral thickness than the air exhausted from the second circuit outlet 92B. Moreover, the air exhausted from the first circuit outlet 92A is (at least initially) directed in the forward, upstream direction by the first door assembly 88A and the air exhausted from the second circuit outlet 92B is directed in the aft, downstream direction (e.g., generally along the vane second side 70B) by the second door assembly 88B. With this arrangement, the air exhausted from the first circuit outlet 92A may push air within the external environment 112 further laterally away from the vane 54 than the air exhausted from the second circuit outlet 92B. The air exhausted from the first circuit outlet 92A may thereby increase an effective camber of the outer portion 78 of the vane 54. This increase in the effective camber may generate additional lift to the second lateral direction such that the aircraft 20 yaws to the starboard; e.g., without use of a traditional physical rudder, such as to trim the aircraft 20 in the yaw axis. In some embodiments, referring to FIGS. 9B1 and 9B2, this effect may be increased by moving the second door assembly 88B to its closed position (see FIG. 9B2; see also FIG. 8C).

Referring to FIGS. 9C1 and 9C2, during a second (e.g., port, left side) yaw mode of operation, the inner door 104A of the first door assembly 88A may be moved to its open position (see FIG. 9C2; see also FIG. 8B) and the outer door 102B of the second door assembly 88B may be moved to its open position (see FIG. 9C1; see also FIG. 8A). Here, the air exhausted from the second circuit outlet 92B is forward, upstream of the air exhausted from the first circuit outlet 92A. The air exhausted from the second circuit outlet 92B therefore initially may flow along a portion of the vane 54 with a greater lateral thickness than the air exhausted from the first circuit outlet 92A. Moreover, the air exhausted from the second circuit outlet 92B is (at least initially) directed in the forward, upstream direction by the second door assembly 88B and the air exhausted from the first circuit outlet 92A is directed in the aft, downstream direction (e.g., generally along the vane first side 70A) by the first door assembly 88A. With this arrangement, the air exhausted from the second circuit outlet 92B may push air within the external environment 112 further laterally away from the vane 54 than the air exhausted from the first circuit outlet 92A. The air exhausted from the second circuit outlet 92B may thereby increase an effective camber of the inner portion 76 of the vane 54. This increase in the effective camber may generate additional lift to the first lateral direction such that the aircraft 20 yaws to the port; e.g., without use of a traditional physical rudder. In some embodiments, referring to FIGS. 9D1 and 9D2, this effect may be increased by moving the first door assembly 88A to its closed position (see also FIG. 8C).

Referring to FIGS. 9E1 and 9E2, during another mode of operation, the inner door 104A of the first door assembly 88A and the inner door 104B of the second door assembly 88B may each be moved to their open positions (see also FIG. 8B). With this arrangement, the open door assemblies 88 facilitate removal of boundary layer air in front of the propulsion system airflow inlets 100 (see FIG. 1) without generating a yaw force. Moreover, by directing the air exhausted from the first circuit outlet 92A and the second circuit outlet 92B in the aft, downstream direction, this exhaust air may have minimal affect on aircraft drag. By contrast, referring to FIGS. 9F1 and 9F2, the outer door 102A of the first door assembly 88A and the outer door 102B of the second door assembly 88B may alternatively be moved to their open positions (see also FIG. 8A). With this arrangement, the open door assemblies 88 still facilitate removal of boundary layer air while also increasing aircraft drag. The air system, for example, may be operated in the mode of operation of FIGS. 9F1 and 9F2 to decrease aircraft speed.

Referring to FIGS. 9G1 and 9G2, during still another mode of operation, the first door assembly 88A and the second door assembly 88B may both be closed (see also FIG. 8C). With this arrangement, aircraft drag may be further reduced. However, the propulsion system airflow inlets 100 of FIG. 1 may receive the boundary layer air that is otherwise removed through the circuit inlets 90 during the operating modes of FIGS. 9A1-F2.

In some embodiments, the vertical stabilizer 30 and its vane 54 may be utilized for lightning strike protection. The vertical stabilizer 30 and its vane 54 may also or alternatively be utilized to increase a radar signature of the aircraft 20 where that aircraft 20 is used for civilian aviation.

Figure 10:
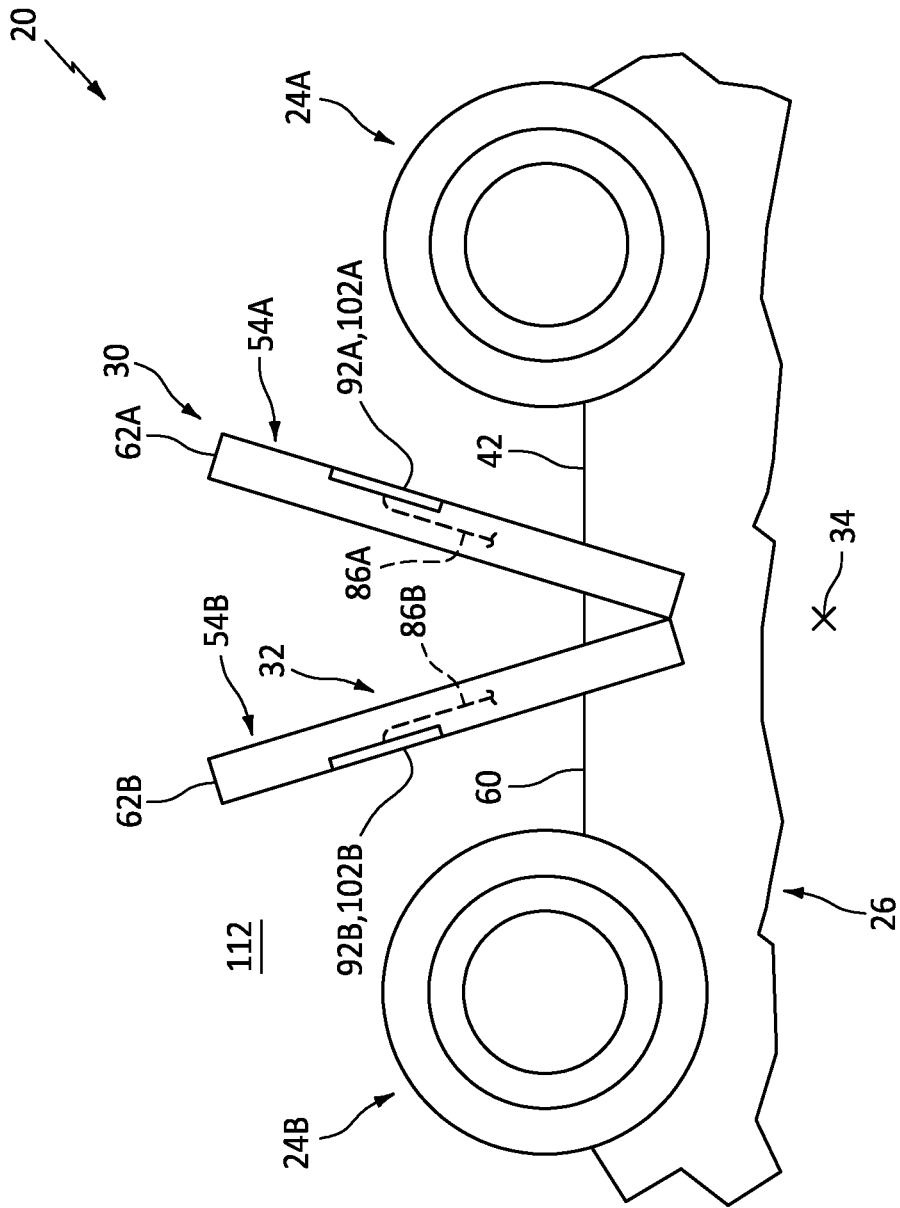
FIG. 10 is a partial rear end view illustration of the aircraft with another vertical stabilizer arrangement.

The vertical stabilizer 30 is described above with a single vane 54. The present disclosure, however, is not limited to such an exemplary arrangement. For example, referring to FIG. 10, the vertical stabilizer 30 may alternatively include multiple vanes 54A and 54B (generally referred to as "54"). Each vane 54A, 54B of FIG. 10 is connected to the aircraft body 26, and may project spanwise out from the aircraft body 26 to its respective vane tip 62A, 62B (generally referred to as "62"). The first vane 54A may be configured with the first air circuit and its first circuit outlet. The second vane 54B may be configured with the second air circuit and its second circuit outlet. Like described above with respect to FIGS. 9A-G, the air system 32 may be operated in various modes of operation, some of which operating modes are schematically exemplified in FIGS. 11A-11G. FIG. 11A illustrates a first (e.g., starboard, right side) yaw mode of operation similar to that of FIGS. 9A1 and 9A2 described above. FIG. 11B illustrates another (e.g., starboard, right side) yaw mode of operation similar to that of FIGS. 9B1 and 9B2 described above. FIG. 11C illustrates a second (e.g., port, left side) yaw mode of operation similar to that of FIGS. 9C1 and 9C2 described above. FIG. 11D illustrates another (e.g., port, left side) yaw mode of operation similar to that of FIGS. 9D1 and 9D2 described above. FIG. 11E illustrates another mode of operation similar to that of FIGS. 9E1 and 9E2 described above. FIG. 11F illustrates another mode of operation similar to that of FIGS. 9F1 and 9F2 described above. FIG. 11G illustrates still another mode of operation similar to that of FIGS. 9G1 and 9G2 described above.

Figure 12:
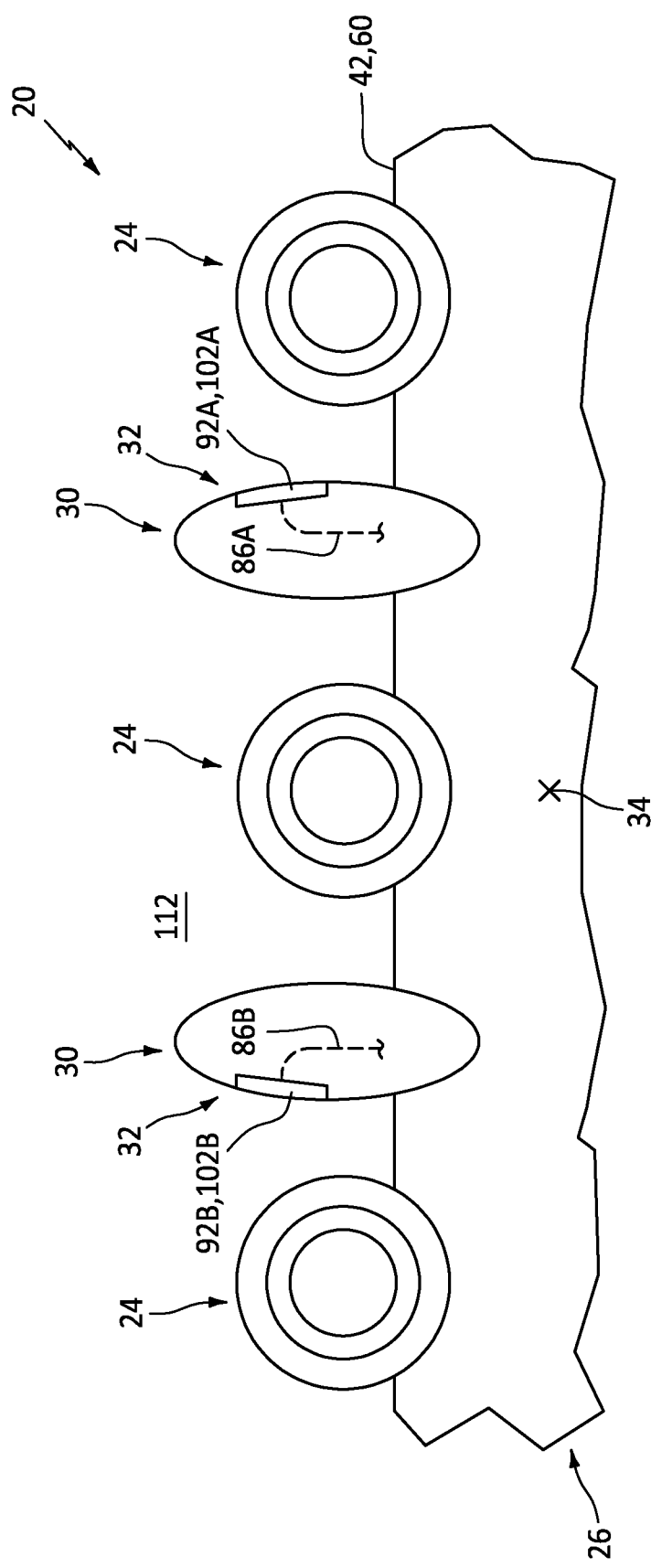
FIG. 12 is a partial rear end view illustration of the aircraft with multiple vertical stabilizers.

In some embodiments, referring to FIGS. 3 and 10, the aircraft 20 may be configured with a single vertical stabilizer 30. In other embodiments, referring to FIG. 12, the aircraft 20 may be configured with multiple of the vertical stabilizers 30, where each vertical stabilizer 30 is arranged laterally between a respective laterally neighboring pair of the aircraft propulsion systems 24. Here, the air system 32 may be operated in various modes of operation similar to that described above and illustrated in FIGS. 11A-11G.

Figure 13:
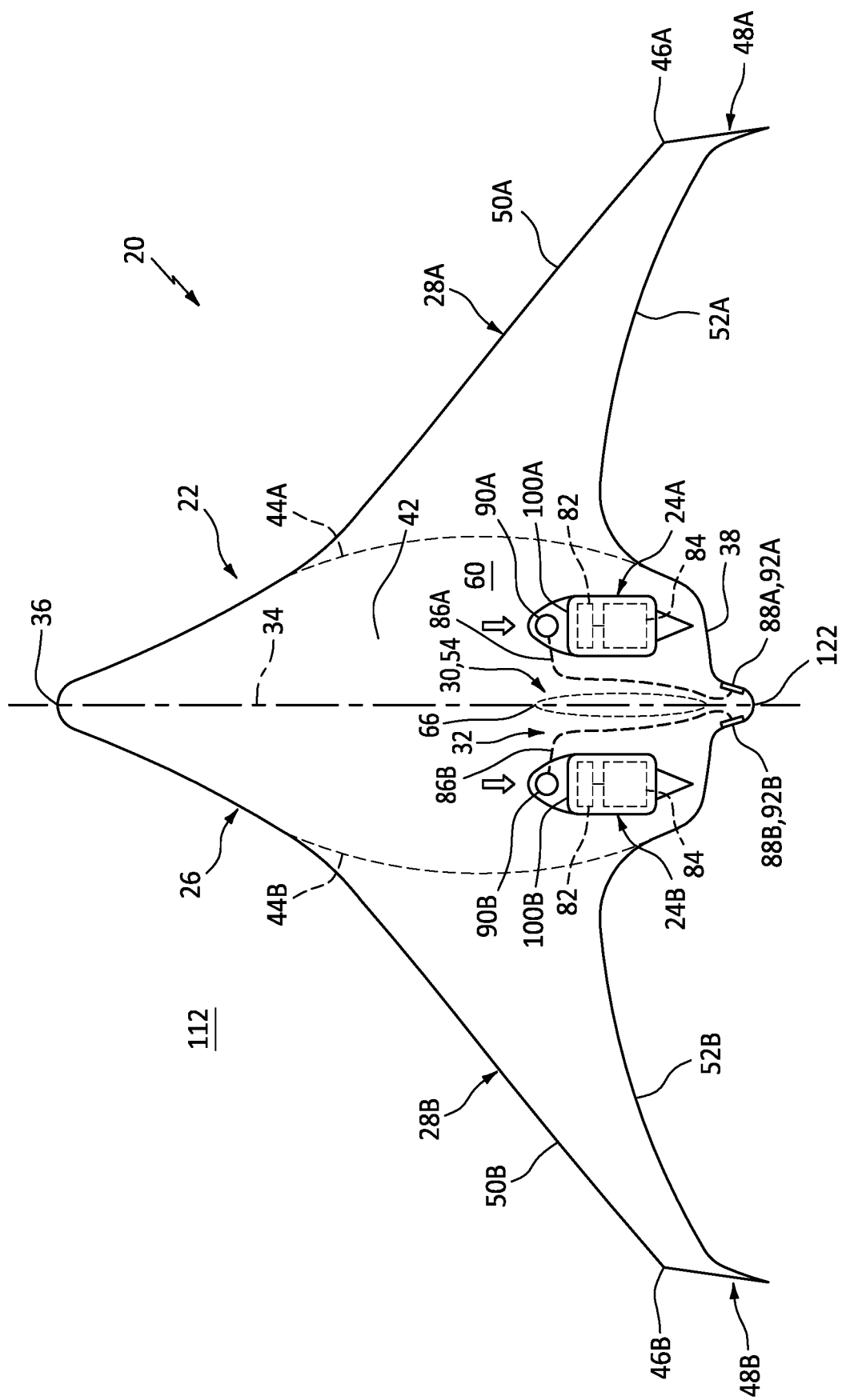
FIG. 13 is a plan view illustration of the aircraft with another air system arrangement.

While the air system 32 of FIG. 1 is described above as being configured with both the aircraft body 26 and the vertical stabilizer 30 (or multiple vertical stabilizers 30), the present disclosure is not limited to such exemplary arrangements. It is contemplated, for example, the air system 32 may be configured discrete from the vertical stabilizer 30 (or multiple vertical stabilizers 30. The aircraft body 26 of FIG. 13, for example, is configured with a protrusion 122 (e.g., a tail) which projects longitudinally out from a base of the aircraft body 26 at the body aft end 38. Here, the first door assembly 88A and the associated first circuit outlet 92A are disposed on a first side of the protrusion 122. The second door assembly 88B and the associated second circuit outlet 92B are disposed on a second side of the protrusion 122 laterally opposite the first side. With this arrangement, it is contemplated the aircraft airframe 22 may be configured with at least one vertical stabilizer 30 (see dashed line) or with no vertical stabilizer.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
a vane extending spanwise from a base to a tip, the vane extending longitudinally from a leading edge to a trailing edge, and the vane extending laterally between a first side and a second side; and
an air system including a first air circuit and a first door assembly, the first air circuit extending in the vane to a first circuit outlet at the first side, and the first door assembly arranged at the first circuit outlet;
the air system configured to exhaust a flow of air out of the first air circuit through the first circuit outlet during a first mode of operation and a second mode of operation, the first door assembly configured to direct the flow of air exhausted from the first circuit outlet longitudinally towards the leading edge during the first mode of operation, and the first door assembly configured to direct the flow of air exhausted from the first circuit outlet longitudinally towards the trailing edge during the second mode of operation.

2. The system of claim 1, wherein the first door assembly is configured to block the first circuit outlet during a third mode of operation.

3. The system of claim 1, wherein
the first door assembly comprises a first door extending longitudinally along the first side between an upstream end and a downstream end;
the first door is configured to laterally displace the upstream end from the first side during the first mode of operation; and
the first door is configured to laterally displace the downstream end from the first side during the second mode of operation.

4. The system of claim 1, wherein
the first door assembly comprises a first door;
the first door is configured to pivot about a first axis to enter the first mode of operation; and
the first door is configured to pivot about a second axis to enter the second mode of operation, and the second axis is upstream of the first axis longitudinally along the first side.

5. The system of claim 1, wherein the first door assembly is disposed longitudinally along the first side closer to the trailing edge than the leading edge.

6. The system of claim 1, further comprising:
an airframe including a body and the vane connected to the body at the base;
the first air circuit extending within the airframe from a first circuit inlet to the first circuit outlet, and the first circuit inlet arranged with the body.

7. The system of claim 6, wherein the first circuit inlet is laterally offset from the vane.

8. The system of claim 6, wherein the body is configured as a blended wing body.

9. The system of claim 6, further comprising:
a first powerplant comprising a powerplant inlet and connected to the body; and
the circuit inlet disposed upstream of and laterally overlapping the powerplant inlet.

10. The system of claim 9, wherein the first powerplant is configured as a propulsion system for the aircraft.

11. The system of claim 9, further comprising:
a second powerplant connected to the body; and
the vane longitudinally overlapping and disposed laterally between the first powerplant and the second powerplant.

12. The system of claim 1, wherein
the air system further includes a second air circuit and a second door assembly;
the second air circuit extends in the vane to a second circuit outlet at the second side;
the second door assembly arranged at the second circuit outlet; and
the air system is configured to exhaust a second flow of air out of the second air circuit through the second circuit outlet during the first mode of operation and the second mode of operation, the second door assembly is configured to direct the second flow of air exhausted from the second circuit outlet longitudinally towards the trailing edge during the first mode of operation, and the second door assembly is configured to direct the second flow of air exhausted from the second circuit outlet longitudinally towards the leading edge during the second mode of operation.

13. The system of claim 12, wherein the second door assembly is spanwise offset from the first door assembly along the vane.

14. The system of claim 12, wherein the second door assembly is longitudinally aligned with the first door assembly along the vane.

15. The system of claim 12, wherein, during a third mode of operation, the first door assembly is configured to close the first circuit outlet and the second door assembly is configured to close the second circuit outlet.

16. The system of claim 12, wherein
the air system is further configured to exhaust the flow of air out of the first air circuit through the first circuit outlet during a third mode of operation, and the first door assembly is configured to direct the flow of air exhausted from the first circuit outlet longitudinally towards the leading edge during the third mode of operation; and
the air system is further configured to exhaust the second flow of air out of the second air circuit through the second circuit outlet during the third mode of operation, and the second door assembly is configured to direct the second flow of air exhausted from the second circuit outlet longitudinally towards the leading edge during the third mode of operation.

17. The system of claim 12, wherein
the air system is further configured to exhaust the flow of air out of the first air circuit through the first circuit outlet during a third mode of operation, and the first door assembly is configured to direct the flow of air exhausted from the first circuit outlet longitudinally towards the trailing edge during the third mode of operation; and
the air system is further configured to exhaust the second flow of air out of the second air circuit through the second circuit outlet during the third mode of operation, and the second door assembly is configured to direct the second flow of air exhausted from the second circuit outlet longitudinally towards the trailing edge during the third mode of operation.

18. A system for an aircraft, comprising:

a vane extending spanwise from a base to a tip, the vane extending longitudinally from a leading edge to a trailing edge, and the vane extending laterally between a first side and a second side; and an air system including a first air circuit, a second air circuit, a first door assembly and a second door assembly;

the first air circuit extending in the vane to a first circuit outlet at the first side, and the first door assembly configured to regulate flow through the first circuit outlet; and the second air circuit extending in the vane to a second circuit outlet at the second side, and the second door assembly configured to regulate flow through the second circuit outlet;

wherein at least one of:

the first door assembly is configured to direct a first flow of air, exhausted from the first air circuit through the first circuit outlet, longitudinally towards the leading edge during a first mode of operation, and the second door assembly is configured to direct a second flow of air, exhausted from the second air circuit through the second circuit outlet, longitudinally towards the trailing edge during the first mode of operation; or the first door assembly is configured to direct the first flow of air, exhausted from the first air circuit through the first circuit outlet, longitudinally towards the trailing edge during a second mode of operation, and the second door assembly is configured to direct the second flow of air, exhausted from the second air circuit through the second circuit outlet, longitudinally towards the leading edge during the second mode of operation.

* * * * *